(12) United States Patent
Nakamura et al.

(10) Patent No.: US 11,285,992 B2
(45) Date of Patent: Mar. 29, 2022

(54) ROTATING ELECTRIC MACHINE CONTROL DEVICE

(71) Applicant: DENSO CORPORATION, Kariya (JP)

(72) Inventors: Kouichi Nakamura, Kariya (JP);
Nobuyori Nakazima, Kariya (JP);
Atsuko Oka, Kariya (JP)

(73) Assignee: DENSO CORPORATION, Kariya (JP)

(*) Notice: Subject to any disclaimer, the term of this patent is extended or adjusted under 35 U.S.C. 154(b) by 21 days.

(21) Appl. No.: 16/867,429

(22) Filed: May 5, 2020

(65) Prior Publication Data

US 2020/0353973 A1 Nov. 12, 2020

(30) Foreign Application Priority Data

May 9, 2019 (JP) .............................. JP2019-088832

(51) Int. Cl.
*H02P 7/00* (2016.01)
*B62D 5/04* (2006.01)
*H02P 21/22* (2016.01)
*H02P 25/22* (2006.01)
*H02P 29/40* (2016.01)
*H02P 27/08* (2006.01)
*H02K 11/27* (2016.01)
*H02P 6/04* (2016.01)

(52) U.S. Cl.
CPC .......... *B62D 5/046* (2013.01); *B62D 5/0481* (2013.01); *H02K 11/27* (2016.01); *H02P 21/22* (2016.02); *H02P 25/22* (2013.01); *H02P 27/08* (2013.01); *H02P 29/40* (2016.02); *H02P 2006/045* (2013.01)

(58) Field of Classification Search
CPC ......... B62D 5/046; G05B 19/46; H02P 21/22; H02P 29/40; H02P 25/22; H02P 21/0089; H02P 2006/045
See application file for complete search history.

(56) References Cited

U.S. PATENT DOCUMENTS

2001/0019251 A1* 9/2001 Nakazawa .............. H02P 25/08
318/701
2009/0079375 A1 3/2009 Suzuki
2018/0152128 A1* 5/2018 Araki ..................... H02P 27/08
2019/0256129 A1 8/2019 Oka et al.
2019/0260324 A1 8/2019 Kuramitsu et al.
2020/0252015 A1 8/2020 Suzuki

FOREIGN PATENT DOCUMENTS

JP 2011195089 A 10/2011

* cited by examiner

*Primary Examiner* — Karen Masih
(74) *Attorney, Agent, or Firm* — Maschoff Brennan

(57) ABSTRACT

A rotating electric machine control device has an electronic control unit, or an ECU that controls driving of a motor having motor windings, and includes mutually-communicable plural control units. The control unit includes a basic instruction calculation unit, a field-weakening calculation unit, and a current control calculation unit and a PWM (pulse width modulation) output unit. The current control calculation unit and the PWM output unit generate a PWM signal based on d-axis current instruction values and q-axis current instruction values that are calculated based on basic current instruction values and field-weakening d-axis current instruction value. At least a part of the instruction values used for generation of the PWM signal is shared by the plural control units.

8 Claims, 15 Drawing Sheets

ROTATING ELECTRIC MACHINE CONTROL DEVICE

CROSS REFERENCE TO RELATED APPLICATION

The present application is based on and claims the benefit of priority of Japanese Patent Application No. 2019-088832, filed on May 9, 2019, the disclosure of which is incorporated herein by reference.

TECHNICAL FIELD

The present disclosure generally relates to a rotating electric machine control device.

BACKGROUND INFORMATION

The related art includes a rotating electric machine control device that controls driving of a rotating electric machine. For example, in the related art, an instruction value calculated by one master control unit is transmitted to a slave control unit, whereby two systems are operated in a coordinated manner.

In the related art, a current feedback control related to a d-axis is performed in the same manner as that of a q-axis. Note that, when the rotating electric machine is an IPM (Interior Permanent Magnet) motor, a d-axis current control needs to consider the effects of a reluctance torque generated due to a difference between a d-axis inductance and a q-axis inductance, for example.

SUMMARY

It is an object of the present disclosure to provide a rotating electric machine control device capable of appropriately controlling driving of a rotating electric machine by using a plurality of systems of control units.

BRIEF DESCRIPTION OF THE DRAWINGS

Objects, features, and advantages of the present disclosure will become more apparent from the following detailed description made with reference to the accompanying drawings, in which.

DETAILED DESCRIPTION

First Embodiment

Figure 1:
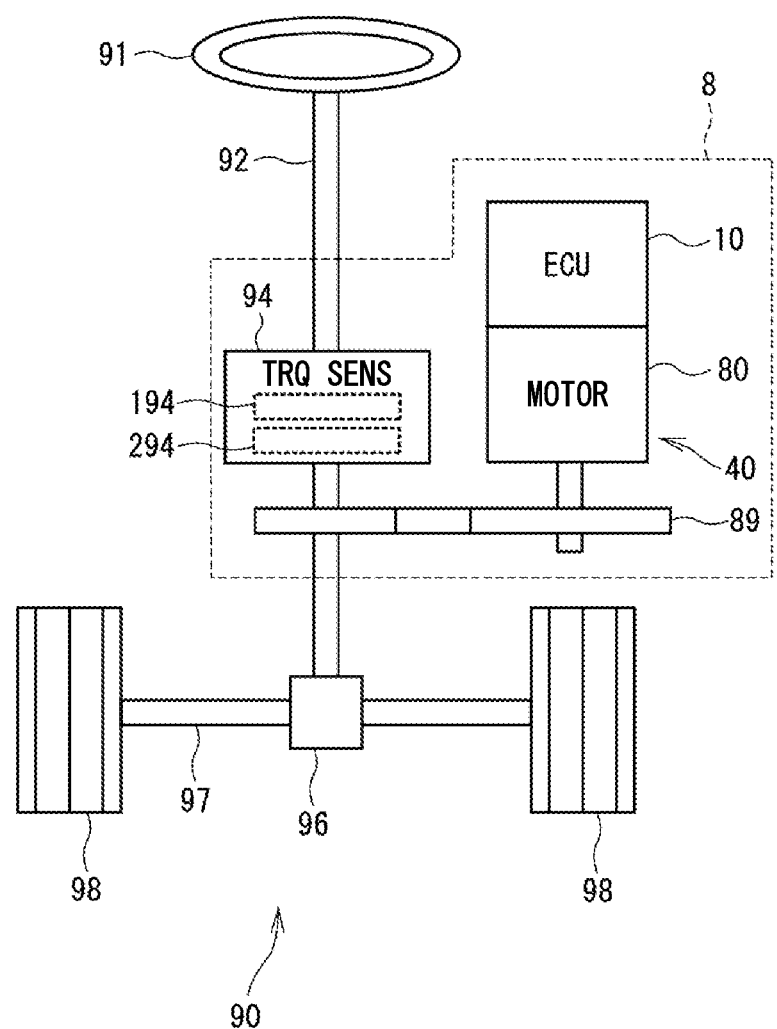
FIG. 1 is a schematic diagram of a steering system according to a first embodiment.

Hereinafter, a rotating electric machine control device according to the present disclosure is described with reference to the drawings. In a plurality of embodiments described below, a substantially identical component is designated by the same reference number to eliminate duplicated description. The first embodiment is illustrated in FIGS. 1 to 9. As shown in FIG. 1, an ECU 10 as a rotating electric machine control device is applied to an electric power steering device 8 for assisting a steering operation of a vehicle, for example, together with a motor 80 as a rotating electric machine.

FIG. 1 shows an overall configuration of a steering system 90 including the electric power steering device 8. The steering system 90 includes a steering wheel 91 which is a steering member, a steering shaft 92, a pinion gear 96, a rack shaft 97, road wheels 98 and the electric power steering device 8.

The steering wheel 91 is connected to the steering shaft 92. A torque sensor 94 is provided on the steering shaft 92 to detect a steering torque. The torque sensor 94 includes a first torque detection unit 194 and a second torque detection unit 294, which are respectively capable of detecting its own failure provided in a duplicated manner. A pinion gear 96 is provided at a tip end of the steering shaft 92. The pinion gear 96 engages with the rack shaft 97. A pair of road wheels 98 is coupled at both ends of the rack shaft 97 via, for example, tie rods.

When a driver of the vehicle rotates the steering wheel 91, the steering shaft 92 connected to the steering wheel 91 rotates. A rotational movement of the steering shaft 92 is converted to a translational movement of the rack shaft 97 by the pinion gear 96. The pair of road wheels 98 is steered to an angle corresponding to a displacement amount of the rack shaft 97.

The electric power steering device 8 includes the motor 80, a speed reduction gear 89, the ECU 10 and the like. The speed reduction gear 89 is a power transmission mechanism that reduces the rotation speed of the motor 80 and transmits the speed-reduced rotation to the steering shaft 92. The electric power steering device 8 of the present embodiment is a column assist type. However, it may alternatively be a rack assist type that transmits the rotation of the motor 80 to the rack shaft 97. In the present embodiment, the steering shaft 92 corresponds to a "drive object."

Figure 2:
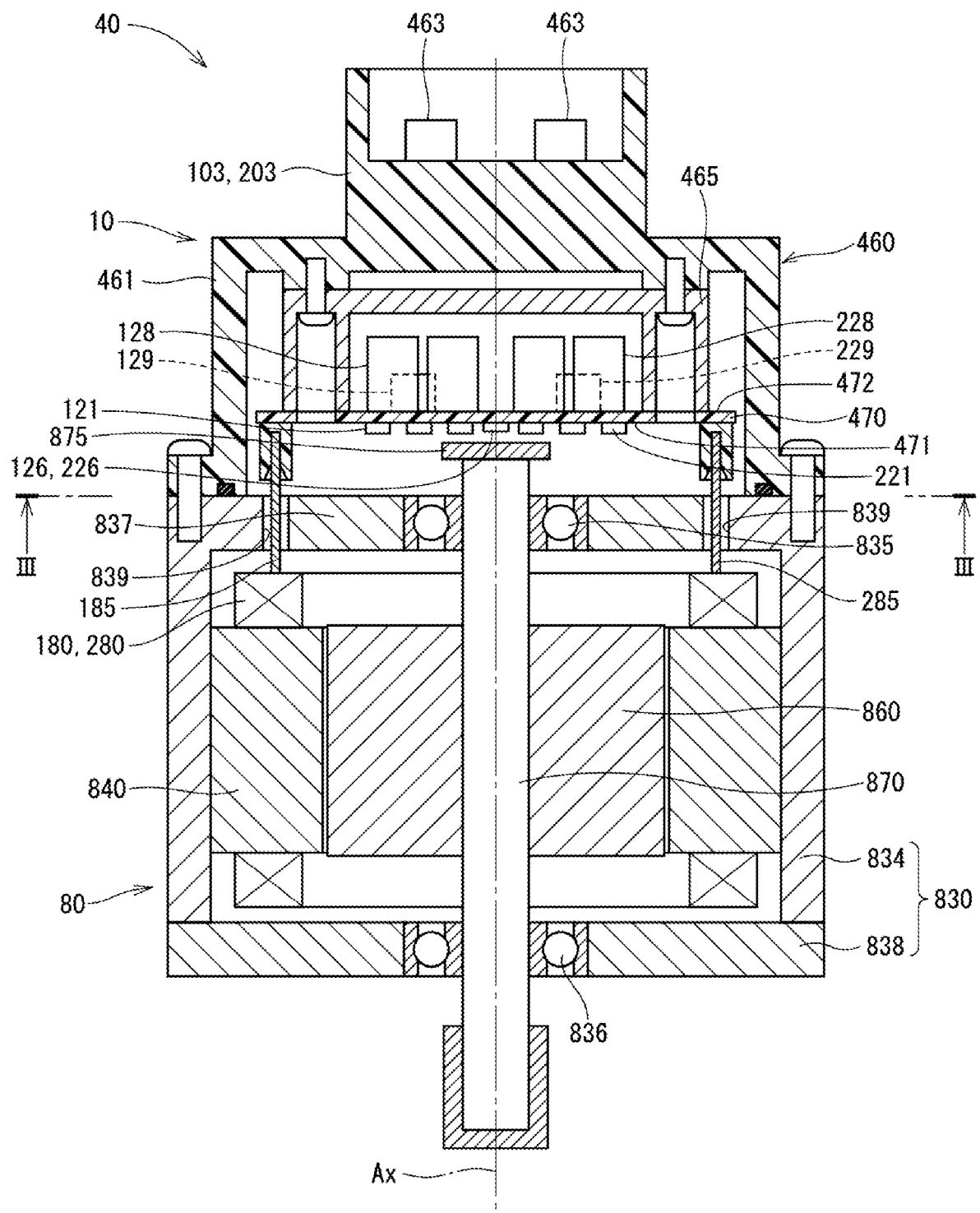
FIG. 2 is a cross-sectional view of a driving device according to the first embodiment.
Figure 3:
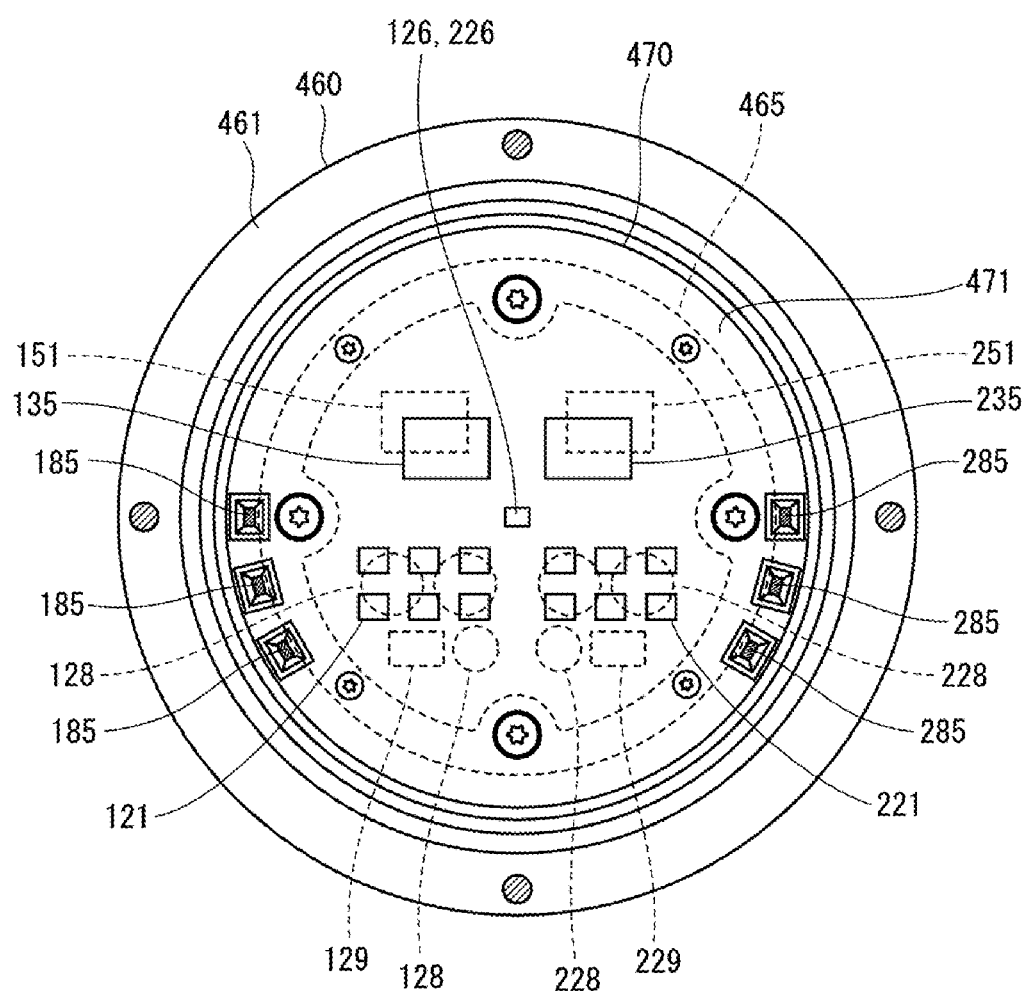
FIG. 3 is a cross-sectional view taken along a line III-III in FIG. 2.

As shown in FIG. 2 and FIG. 3, the motor 80 outputs a whole or a part of a torque required for a steering operation. The motor 80 is driven by electric power supplied from batteries 191 and 291 (see FIG. 4) as a direct current power supply to rotate the speed reduction gear 89 in forward and backward directions. The motor 80 is a three-phase brushless motor, and has a rotor 860 and a stator 840.

The motor 80 has a first motor winding 180 and a second motor winding 280. The motor windings 180 and 280 have the same electrical characteristics, and are wound on the one, i.e., same, stator 840 with electrical angles shifted by 30 degrees in a cancel winding form. Correspondingly, phase currents are controlled to be supplied to the motor windings 180 and 280 such that the phase currents in those windings 180 and 280 have a phase difference φ of 30 degrees. By optimizing a current supply phase difference, an output torque of the motor 80 is improved. In addition, a sixth-order torque ripple is reducible, thereby reducing noise and vibration. In addition, by distributing the electric current among two systems, heat generation from the two systems is also evenly distributed, thereby reducing temperature-dependent inter-system errors in detection values, output torques and the like, while increasing the suppliable amount of the electric current. The electrical characteristics of the motor windings 180, 280 may be respectively different.

Hereinafter, a combination of a first inverter circuit 120, a first control unit 151 and the like related to the energization control of the first motor winding 180 is referred to as a first system L1, and a combination of a second inverter circuit 220, a second control unit 251 and the like related to the energization control of the second motor winding 280 is referred to as a second system L2. Further, the configuration related to the first system L1 is basically indicated with 100 plus reference numbers, and the configuration related to the second system L2 is basically indicated with 200 plus reference numbers. Further, the configuration related to the first control unit 151 of the first system L1 described later is indicated with 500 plus reference numbers, and the configuration related to the second control unit 251 of the second system L2 is indicated with 600 plus reference numbers. In the first system L1 and the second system L2, the same or similar configurations are indicated with the same last two digits, and the description of the same configuration is omitted as appropriate. For the other configuration described below, the term "first" is indicated with a suffix "1," and the term "second" is indicated with a suffix "2."

In a driving device 40, the ECU 10 is integrally provided on one side in the axial direction of the motor 80, which may be called as a machine-electronics integrated type motor. The motor 80 and the ECU 10 may alternatively be provided separately in two bodies. The ECU 10 is positioned coaxially with an axis Ax of a shaft 870 on one side opposite to an output shaft of the motor 80. The ECU 10 may alternatively be provided on the output shaft side of the motor 80. By adopting the machine-electronics integrated configuration, it is possible to efficiently arrange the ECU 10 and the motor 80 in a vehicle having restricted mounting space.

The motor 80 includes the stator 840, the rotor 860, and a housing 830 that houses the stator 840 and the rotor 860, together with other components. The stator 840 is fixed to the housing 830 and the motor windings 180 and 280 are wound thereon. The rotor 860 is provided on the radial inside of the stator 840, to be rotatable relative to the stator 840, with a magnet buried therein. That is, the motor 80 of the present embodiment is an interior permanent magnet (IPM) type motor.

The shaft 870 is fitted in the rotor 860 to rotate integrally with the rotor 860. The shaft 870 is rotatably supported by the housing 830 by bearings 835 and 836. An end portion of the shaft 870 on the ECU 10 side protrudes from the housing 830 toward the ECU 10. A magnet 875 is provided at the axial end of the shaft 870 on the ECU 10 side.

The housing 830 has a bottomed cylindrical case 834 including a rear frame end 837, and a front frame end 838 provided on an open side of the case 834. The case 834 and the front frame end 838 are fastened to each other by bolts or the like. Lead wire insertion holes 839 are formed in the rear frame end 837. Lead wires 185 and 285 connected to each phase of the motor windings 180 and 280 are inserted through the lead wire insertion holes 839. Lead wires 185 and 285 are taken out from the lead wire insertion holes 839 to extend toward the ECU 10, and are connected to a circuit board 470.

The ECU 10 includes a cover 460 and a heat sink 465 fixed to the cover 460 in addition to the circuit board 470 fixed to the heat sink 465. The ECU 10 further includes various electronic components and the like mounted on the circuit board 470.

The cover 460 protects the electronic components from external impacts and prevents dust, water or the like from entering into the ECU 10. In the cover 460, a cover main body 461 and connector units 103 and 203 are integrally formed. The connector units 103 and 203 may alternatively be separated from the cover main body 461. The connector unit 103 includes a power connector 111, a vehicle communication connector 112, and a torque connector, which are described later, and the connector unit 203 includes a power connector 211, a vehicle communication connector 212, and a torque connector 213 (see FIG. 4). Terminals 463 of the connector units 103 and 203 are connected to the circuit board 470 via wirings (not shown) or the like. The number of connectors and the number of terminals may be changed in correspondence to the number of signals and the like. The connector units 103 and 203 are provided at the end portion of the driving device 40 in the axial direction, and respectively have an opening on one side opposite to the motor 80.

The circuit board 470 is, for example, a printed circuit board, and is positioned to face the rear frame end 837. On the circuit board 470, the electronic components of the first and second systems are mounted independently for each system so that the two systems are provided in a fully-redundant configuration. According to the present embodiment, the electronic components are mounted on one circuit board 470. The electronic components may alternatively be mounted on plural circuit boards.

Of the two principal surfaces of the circuit board 470, one surface facing the motor 80 is referred to as a motor-side surface 471 and the other surface opposite (i.e., facing away) from the motor 80 is referred to as a cover-side surface 472. As shown in FIG. 3, on the motor-side surface 471, switching elements 121 that constitute the inverter circuit 120, switching elements 221 that constitute the inverter circuit 220, rotation angle detectors 126 and 226, custom ICs 135 and 235, and the like are mounted. The rotation angle detectors 126 and 226 are mounted at positions facing the magnet 875 so that the change in the magnetic field accompanying the rotation of the magnet 875 can be detected.

On the cover-side surface 472, capacitors 128, 228, inductors 129, 229, and microcomputers constituting the control units 151, 251 are mounted. In FIG. 3, reference numbers 151 and 251 are assigned to the microcomputers provided as the control units 151 and 251, respectively. The capacitors 128 and 228 smoothen electric power input from the batteries 191 and 291. The capacitors 128 and 228 assist supply of electric power to the motor 80 by storing electric charge therein. The capacitors 128, 228 and the inductors 129, 229 serve as filter circuits, respectively, to reduce noises transmitted from other devices which share the battery with the driving device 40, and also to reduce noises transmitted to the other devices, which share the battery, from the driving device 40. Although not shown in FIG. 3, a power supply relay, a motor relay, and current detectors 127 and 227 are also mounted on the motor-side surface 471 or on the cover-side surface 472.

Figure 4:
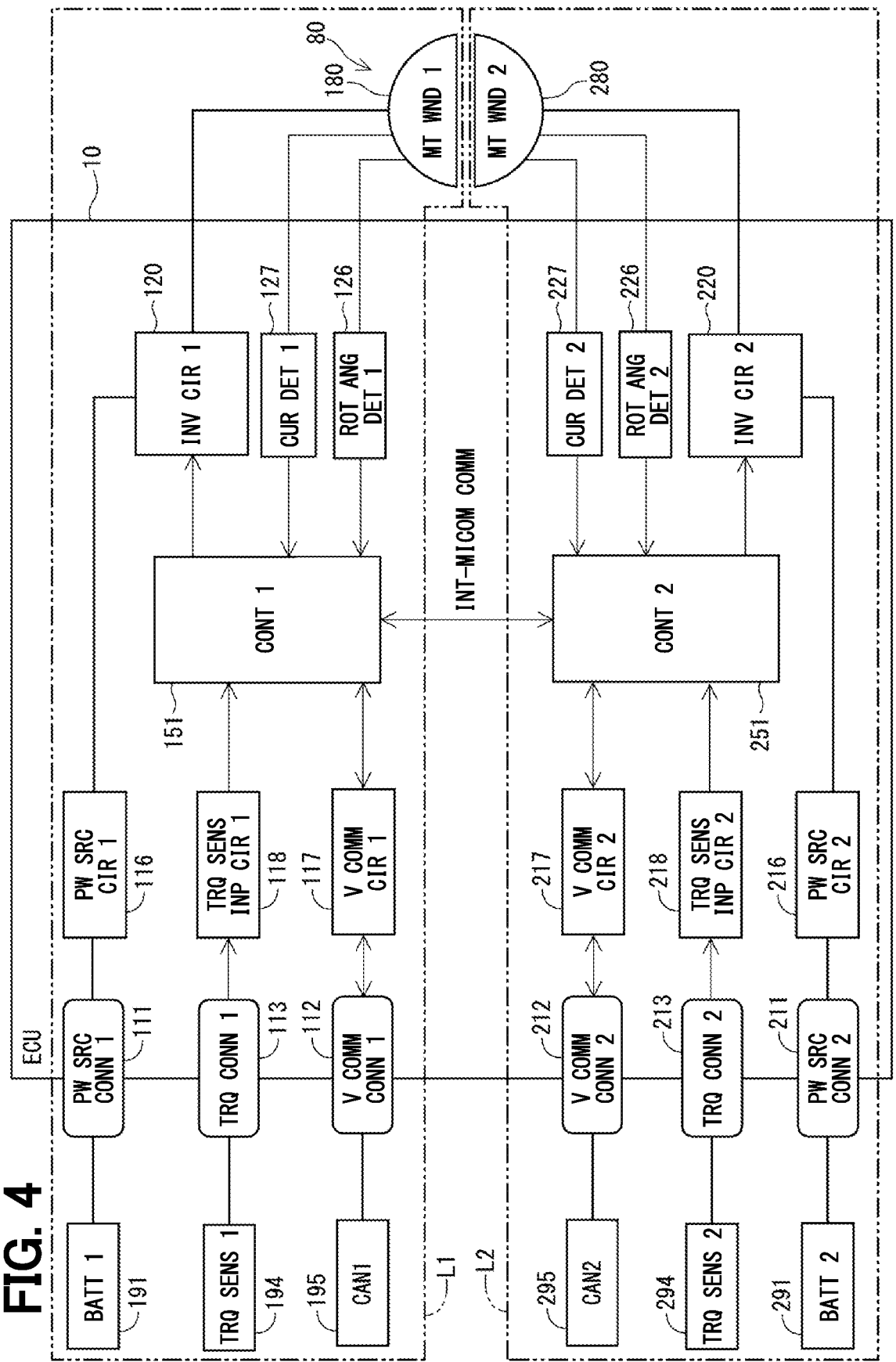
FIG. 4 is a block diagram of an electronic control unit (ECU) according to the first embodiment.

As shown in FIG. 4, the ECU 10 includes the inverter circuits 120, 220 and the control units 151, 251. The ECU 10 is provided with the power connectors 111 and 211, the vehicle communication connectors 112 and 212, and the torque connectors 113 and 213. The first power connector 111 is connected to the first battery 191 and the second power connector 211 is connected to the second battery 291. The power connectors 111 and 211 may also be connected to the same battery. The first power connector 111 is connected to the first inverter circuit 120 via a first power supply circuit 116. The second power connector 211 is connected to the second inverter circuit 220 via a second power supply circuit 216. The power supply circuits 116 and 216 are, for example, power supply relays.

The vehicle communication connector 112 is connected to a vehicle communication network 195, and the vehicle communication connector 212 is connected to a vehicle communication network 295. The vehicle communication connectors 112 and 212 are connected to separate vehicle communication networks 195 and 295, respectively, but may also be connected to the same vehicle communication network. Regarding the vehicle communication networks 195 and 295 in FIG. 4, CAN (controller area network) is exemplified. However, any other standard such as CAN-FD (CAN with flexible data rate) and FlexRay may also be employed. The control units 151 and 251 respectively transmit and receive various signals to and from the vehicle communication networks 195 and 295 via the vehicle communication circuits 117 and 217, respectively.

The torque connectors 113 and 213 are connected to the torque sensor 94. More practically, the first torque connector 113 is connected to a first sensor unit 194 of the torque sensor 94. The second torque connector 213 is connected to a second sensor unit 294 of the torque sensor 94. In FIG. 4, the first torque sensor unit 194 is described as "a torque sensor 1" (i.e., TRQ SENS 1) and the second torque sensor unit 294 is described as "a torque sensor 2" (i.e., TRQ SENS 2).

The first control unit 151 obtains a torque signal related to a steering torque Ts from the first torque sensor unit 194 of the torque sensor 94 via the torque connector 113 and a torque sensor input circuit 118. The second control unit 251 obtains a torque signal related to the steering torque Ts from the second torque sensor unit 294 of the torque sensor 94 via the torque connector 213 and a torque sensor input circuit 218. Thereby, the control units 151 and 251 calculate the steering torques Ts based on the torque signals.

The first inverter circuit 120 is a three-phase inverter having six switching elements 121, and converts electric power supplied to the first motor winding 180. The switching elements 121 are controlled to be turned on and off based on control signals output from the second control unit 151. The second inverter circuit 220 is a three-phase inverter having six switching elements 221, and converts electric power supplied to the second motor winding 280. The switching elements 221 are controlled to be turned on and off based on control signals output from the second control unit 251.

The first current detector 127 detects an electric current flowing in each phase of the first motor winding 180, and outputs a detection value to the first control unit 151. The second current detector 227 detects an electric current flowing in each phase of the second motor winding 280, and outputs a detection value to the second control unit 251. The first rotation angle detector 126 detects a rotation angle of the motor 80, and outputs a detection value to the first control unit 151. The second rotation angle detector 226 detects a rotation angle of the motor 80, and outputs a detection value to the second control unit 251.

The control units 151 and 251 are respectively configured mainly as a microcomputer or the like, and respectively include therein a CPU, ROM, RAM, I/O (not shown) and a bus line for connecting these configurations. Each of the processes performed by of the control units 151 and 251 may be software process or may be hardware process. The software process may be implemented by causing the CPU to execute a program. The program may be stored beforehand in a memory device such as a ROM, that is, in a computer-readable, non-transitory, tangible storage medium. The hardware process may be implemented by a special purpose electronic circuit. The first control unit 151 and the second control unit 251 are configured to be mutually communicable. Hereinafter, communication between the control units 151 and 251 is referred to as "inter-microcomputer communication." A method of communication therebetween may be any method such as (i) serial communication such as SPI or SENT, or (ii) CAN communication, or (iii) FlexRay communication. The same applies to the control unit in the other embodiments described later.

Figure 5:
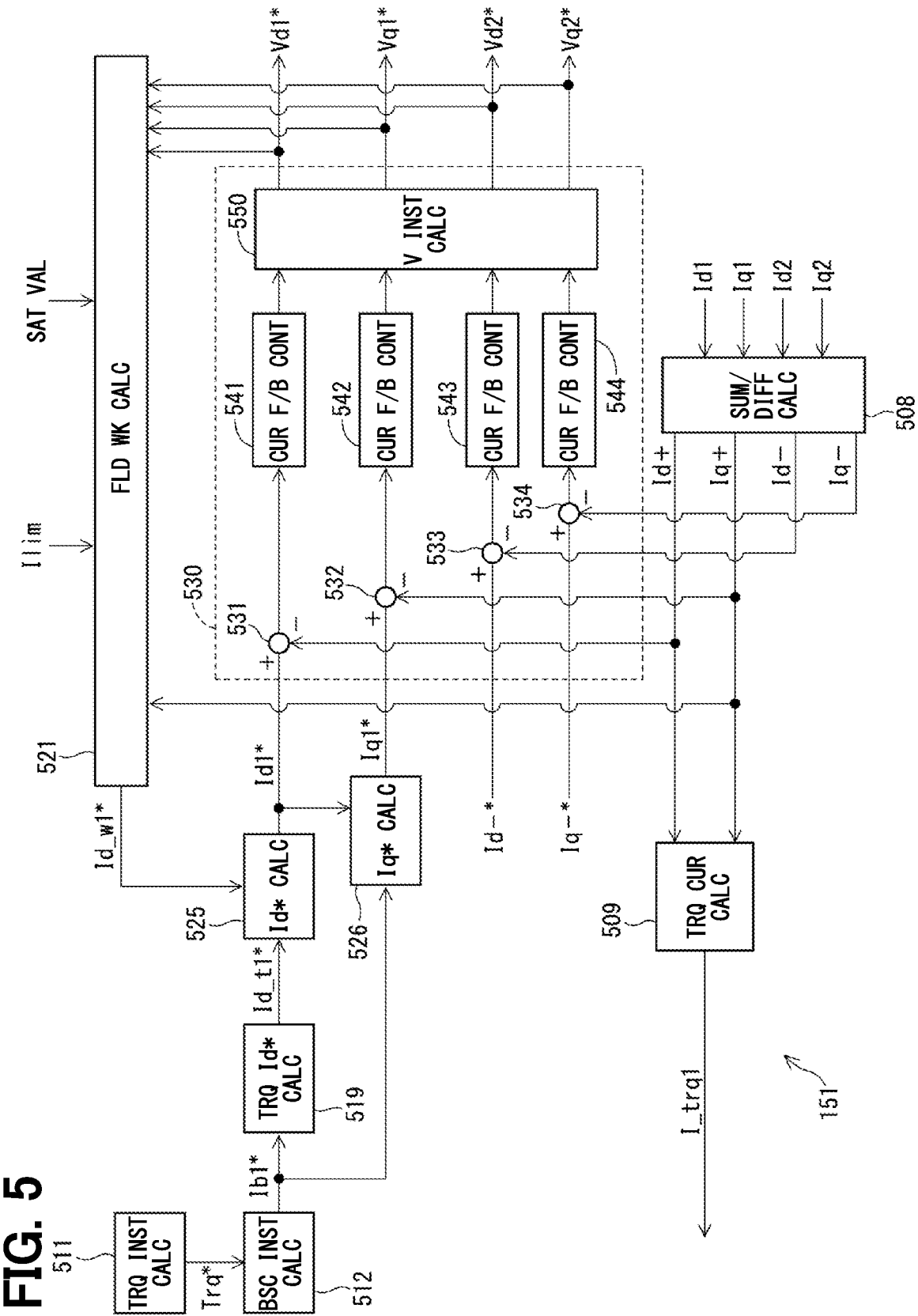
FIG. 5 is a block diagram illustrating a first control unit according to the first embodiment.
Figure 6:
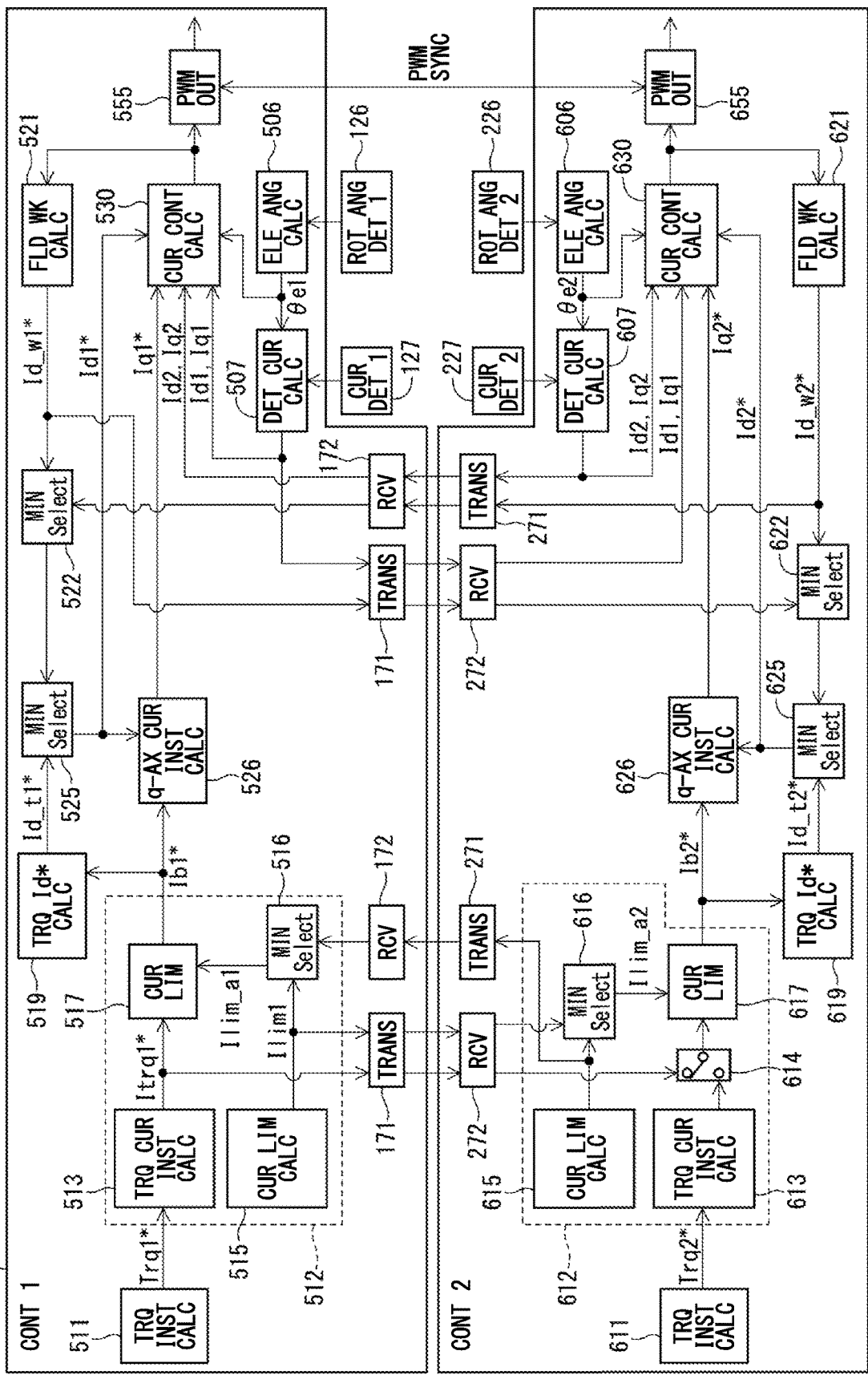
FIG. 6 is a block diagram illustrating the first control unit and a second control unit according to the first embodiment.

As shown in FIGS. 5 and 6, the first control unit 151 includes an electrical angle calculation unit 506, a detection current calculation unit 507, a torque instruction calculation unit 511, a basic instruction calculation unit 512, a torque d-axis current instruction calculation unit 519, a field-weakening calculation unit 521, a field-weakening d-axis current instruction arbitration unit 522, a d-axis current instruction calculation unit 525, a q-axis current instruction calculation unit 526, a current control calculation unit 530, a PWM output unit 555, a transmission unit 171, a receiving unit 172 and the like.

The second control unit 251 includes an electrical angle calculation unit 606, a detection current calculation unit 607, a torque instruction calculation unit 611, a basic instruction calculation unit 612, a torque d-axis current instruction calculation unit 619, a field-weakening calculation unit 621, and a field-weakening d-axis current instruction arbitration unit 622, a d-axis current instruction calculation unit 625, a q-axis current instruction calculation unit 626, a current control calculation unit 630, a PWM output unit 655, a transmission unit 271, a receiving unit 272, and the like.

The transmission unit 171 transmits a value calculated by the first control unit 151 to the second control unit 251. The receiving unit 172 receives a value transmitted from the second control unit 251. The transmission unit 271 transmits a value calculated by the second control unit 251 to the first control unit 151. The receiving unit 272 receives a value transmitted from the first control unit 151. In FIG. 6 and other drawings, the transmission units 171 and 271 and the receiving units 172 and 272 are appropriately separated for convenience of illustration. In the following description, the description regarding the second control unit 251 is omitted as appropriate, since the first control unit 151 is described as an example of a subject system with the second control unit 251 serving as other system, which may in turn be operated as the subject system if the subject system and the other system are reversed. In addition, FIG. 5 only describes the first control unit 151, without describing the second control unit 251.

The electrical angle calculation unit 506 calculates an electrical angle $\theta e1$ based on the detection value of the rotation angle detector 126. The detection current calculation unit 507 calculates each of phase currents Iu1, Iv1, and Iw1 based on the detection value of the current detector 127. Further, the detection current calculation unit 507 performs dq conversion on each of the phase currents Iu1, Iv1, Iw1 using the electrical angle θel, and calculates a d-axis current detection value Id1 and a q-axis current detection value Iq1. Hereinafter, when the values of the d-axis and the q-axis are collectively described, they are referred to as "dq-axes." The dq-axes current detection values Id1 and Iq1 are used for electric current control calculation in the subject system, and are transmitted to the second control unit 250 via the inter-microcomputer communication to be used for electric current control in the other system.

As shown in FIG. 5, an sum-difference calculation unit 508 obtains the dq-axes current detection values Id1 and Iq1 of the first system L1 and dq-axes current detection values Id2 and Iq2 of the second system L2. The sum-difference calculation unit 508 includes a d-axis current sum Id+ that is a sum of the d-axis current detection values Id1 and Id2, a d-axis current difference Id− that is a difference between the d-axis current detection values Id1 and Id2, and a q-axis current sum Iq+ that is a sum of the q-axis current detection values Iq1 and Iq2 and a q-axis current difference Iq− that is a difference between the q-axis current detection values Iq1 and Iq2. A torque current calculation unit 509 calculates a torque current detection value I_trq1 based on the d-axis current sum Id+ and the q-axis current sum Iq+. In the present embodiment, the output torque of the motor 80 is monitored by monitoring the torque current detection value I_trq1.

As shown in FIG. 6, the torque instruction calculation unit 511 calculates a torque instruction value Trq1* based on the steering torque, the vehicle speed, and the like. The basic instruction calculation unit 512 of the first control unit 151 includes a torque current instruction calculation unit 513, a current limit calculation unit 515, a current limit arbitration unit 516, and a current limit unit 517, and calculates a basic current instruction value Ib1*. The basic instruction calculation unit 612 of the second control unit 251 includes a torque current instruction calculation unit 613, a switching unit 614, a current limit calculation unit 615, a current limit arbitration unit 616, and a current limit unit 617, and calculates a basic current instruction value Ib2*.

The torque current instruction calculation units 513 and 613 calculate torque current instruction values Itrq1* and Itrq2* by multiplying, for example, a predetermined coefficient based on the torque instruction values Trq1* and Trq2*. The first torque current instruction value Itrq1* is transmitted to the second control unit 251.

The switching unit 614 can switch between torque current instruction values Itrq1* and Itrq2* used for control. In the present embodiment, the first control unit 151 is a master control unit, the second control unit 251 is a slave control unit, and if the first torque current instruction value Itrq1* is normal, the second control unit 251 uses the first current instruction value Itrq1* preferentially, i.e., in a prioritized manner. In addition, when the torque current instruction value Itrq1* is not reliable, e.g., when the torque current instruction value Itrq1* cannot be obtained due to a failure or the like, or when a difference between the torque current instruction values Itrq1* and Itrq2* is greater than an abnormality determination threshold, the torque current instruction value Itrq2* of the subject system is used, wherein the subject system in this scenario, unlike the aforementioned subject system, means the second system L2. Here, it is assumed that the first torque current instruction value Itrq1* is normal and the switching unit 614 selects the first torque current instruction value Itrq1*.

The current limit calculation unit 515 calculates a current limit value Ilim1 for overheat protection or the like. The current limit value Ilim1 is transmitted to the second control unit 251. In addition, the first control unit 151 obtains the current limit value Ilim2 calculated by the second control unit 251.

The current limit arbitration unit 516 calculates a post-arbitration current limit value Ilim_a1 based on the current limit value Ilim1 of the subject system and the current limit value Ilim2 of the other system. In the present embodiment, the post-arbitration current limit value Ilim_a1 is calculated by minimum selection. That is, when the current limit value Ilim1 of the subject system is smaller than the current limit value Ilim2 of the other system, the current limit value Ilim1 of the subject system is set as the post-arbitration current limit value Ilim_a1, and the current limit value Ilim1 of the subject system is equal to or greater than the current limit value Ilim2 of the other system, the current limit value Ilim2 of the other system is set as the post-arbitration current limit value Ilim_a1.

The current limit unit 517 calculates the basic current instruction value Ib1* based on the torque current instruction value Itrq1* and the post-arbitration current limit value Ilim_a1. When the torque current instruction value Itrq1* is smaller than the post-arbitration current limit value Ilim_a1, the torque current instruction value Itrq1* is set as the basic current instruction value Ib1*, and when the torque current instruction value Itrq1* is equal to or greater than the post-arbitration current limit value Ilim_a1, the post-arbitration current limit value Ilim_a1 is set as the basic current instruction value Ib1*. The current limit unit 617 calculates a basic current instruction value Ib2* based on the torque current instruction value selected by the switching unit 614 and the post-arbitration current limit value Ilim_a2.

The torque d-axis current instruction calculation unit 519 calculates a torque d-axis current instruction value Id_t1* by map calculation or the like based on the basic current instruction value Ib1*.

The field-weakening calculation unit 521 calculates a pre-limit field-weakening d-axis current instruction value Id_wb1* based on the current limit value Ilim1, a saturation value with respect to a maximum applicable voltage, a modulation rate of a voltage instruction value, and the like.

Figure 7:
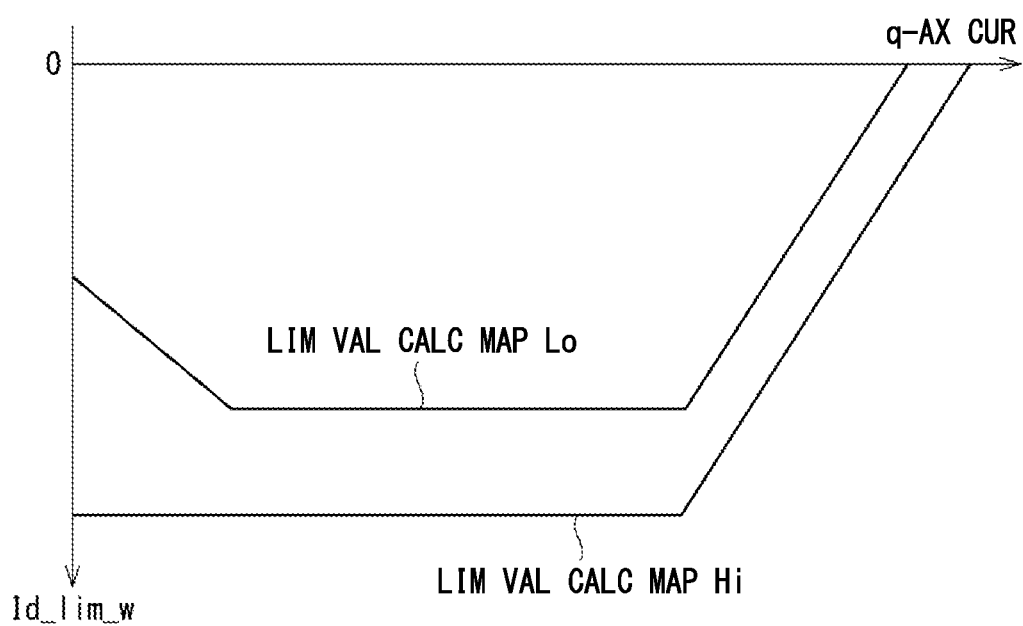
FIG. 7 is an explanatory diagram illustrating a limit value control map according to the first embodiment.

Further, the field-weakening calculation unit 521 obtains the q-axis current sum Iq+ from the sum-difference calculation unit 508, and calculates a field-weakening d-axis current limit value Id_lim_w1 based on the q-axis current sum Iq+. In the present embodiment, the field-weakening d-axis current limit value Id_lim_w1 is calculated by map calculation using a map shown in FIG. 7. In FIG. 7, the suffix indicating the system number is omitted. The map used for the calculation of the field-weakening d-axis current limit value Id_lim_w1 is selected based on the basic current instruction value Ib1*. More specifically, when the basic current instruction value Ib1* is greater than a map switching determination value, a limit value calculation map Hi is used, and when the basic current instruction value Ib1* is equal to or less than the map switching determination value, a limit value calculation map Lo is used. The map switching determination value can be arbitrarily set. In an example of FIG. 7, two maps are switched, but the number of maps to be switched may be one or three or more.

When an absolute value of the pre-limit field-weakening d-axis current instruction value Id_wb1* is smaller than an absolute value of the field-weakening d-axis current limit value Id_lim_w1, the field-weakening calculation unit 521 uses the pre-limit field-weakening d-axis current instruction value Id_wb1* "as is" as the field-weakening d-axis current instruction value Id_w1*. Further, when the absolute value of the pre-limit field-weakening d-axis current instruction value Id_wb1* is equal to or greater than the absolute value of the field-weakening d-axis current limit value Id_lim_w1, the field-weakening d-axis current limit value Id_lim_w1 is set as the field-weakening d-axis current instruction value Id_w1*. The field-weakening d-axis current instruction value Id_w1* is transmitted to the second control unit 251. In addition, the first control unit 151 obtains the field-weakening d-axis current instruction value Id_w2* calculated by the second control unit 251. That is, in limiting the electric current, if the d-axis current has a negative value, the smaller absolute value is selected.

The field-weakening d-axis current instruction arbitration unit 522 calculates a post-arbitration field-weakening d-axis current instruction value Id_wa1* based on the field-weakening d-axis current instruction value Id_w1* of the subject system and the field-weakening d-axis current instruction value Id_w2* of the other system. In the present embodiment, the post-arbitration field-weakening d-axis current instruction value Id_wa1* is calculated by minimum selection. That is, when the field-weakening d-axis current instruction value Id_wa1* of the subject system is smaller than the field-weakening d-axis current instruction value Id_wa2* of the other system, the field-weakening d-axis current instruction value Id_wa1* of the subject system is set as the post-arbitration field weakening d-axis current instruction value Id_wa1*, and when the field-weakening d-axis current instruction value Id_wa1* is equal to or greater than the field-weakening d-axis current instruction value Id_wa2* of the other system, the field-weakening d-axis current instruction value Id_wa2* of the other system is set as the post-arbitration field-weakening d-axis current instruction value Id_wa1*. Note that if the d-axis current has a negative value, the minimum selection selects one with a greater absolute value. The same applies to the minimum selection related to other d-axis currents. In FIG. 5, for simplification, description of the field-weakening d-axis current instruction arbitration unit 522 is omitted, and the field-weakening d-axis current instruction value Id_w1* of the subject system is described as being input to the d-axis current instruction calculation unit 525.

The d-axis current instruction calculation unit 525 calculates the d-axis current instruction value Id1* based on the torque d-axis current instruction value Id_t1* and the post-arbitration field-weakening d-axis current instruction value Id_wa1*. In the present embodiment, the d-axis current instruction value Id1* is calculated by the minimum selection. That is, when the torque d-axis current instruction value Id_t1* is smaller than the post-arbitration field-weakening d-axis current instruction value Id_wa1*, the torque d-axis current instruction value Id_t1* is set as the d-axis current instruction value Id1*, and when the torque d-axis current instruction the value Id_t1* is greater than the post-arbitration field-weakening d-axis current instruction value Id_wa1*, the post-arbitration field-weakening d-axis current instruction value Id_wa1* is set as the d-axis current instruction value Id1*. Based on the basic current instruction value Ib1* and the d-axis current instruction value Id1*, the q-axis current instruction calculation unit 526 calculates the q-axis current instruction value Iq1* by, for example, map calculation.

The current control calculation unit 530 includes subtractors 531 to 534, current feedback control units 541 to 544, a voltage instruction calculation unit 550, and the like. The subtractor 531 subtracts the d-axis current sum Id+ from the d-axis current instruction value Id1* to calculate a d-axis current sum deviation ΔId+. The subtractor 532 subtracts the q-axis current sum Iq+ from the q-axis current instruction value Iq1* to calculate a q-axis current sum deviation ΔIq+. The subtractor 533 subtracts the d-axis current difference Id− from the d-axis current difference instruction value Id−* to calculate a d-axis current difference deviation ΔId−. The subtractor 534 subtracts the q-axis current difference Iq− from the q-axis current difference instruction value Iq−* to calculate a q-axis current difference deviation Iq−.

The current feedback control units 541 to 544 are configured to calculated a d-axis voltage sum instruction value Vd+*, a q-axis voltage sum instruction value Vq+*, a d-axis voltage difference instruction value Vd−*, and a q-axis voltage difference instruction value Vq−* by PI (i.e., proportional-integral) calculation, for example, so that the d-axis current sum deviation ΔId+, the q-axis current sum deviation Iq+, the d-axis current difference deviation ΔId−, and the q-axis current difference deviation ΔIq− respectively converge to 0. Based on the d-axis voltage sum instruction value Vd+*, the q-axis voltage sum instruction value Vq+*, the d-axis voltage difference instruction value Vd−*, and the q-axis voltage difference instruction value Vq−*, the voltage instruction calculation unit 550 calculates the instruction values Vd1*, Vq1*, Vd2*, Vq2*.

The PWM output unit 555 generates a PWM signal based on the three-phase voltage instructions Vu1*, Vv1*, and Vw1* obtained by performing inverse dq conversion on the voltage instruction values Vd1* and Vq1*. The PWM signal is synchronized, for example, by using a synchronization signal so that the signal timing is matched among the different systems. The synchronization signal may be transmitted from one system to the other system, or both systems may obtain the one from an outside signal source.

Figure 8:
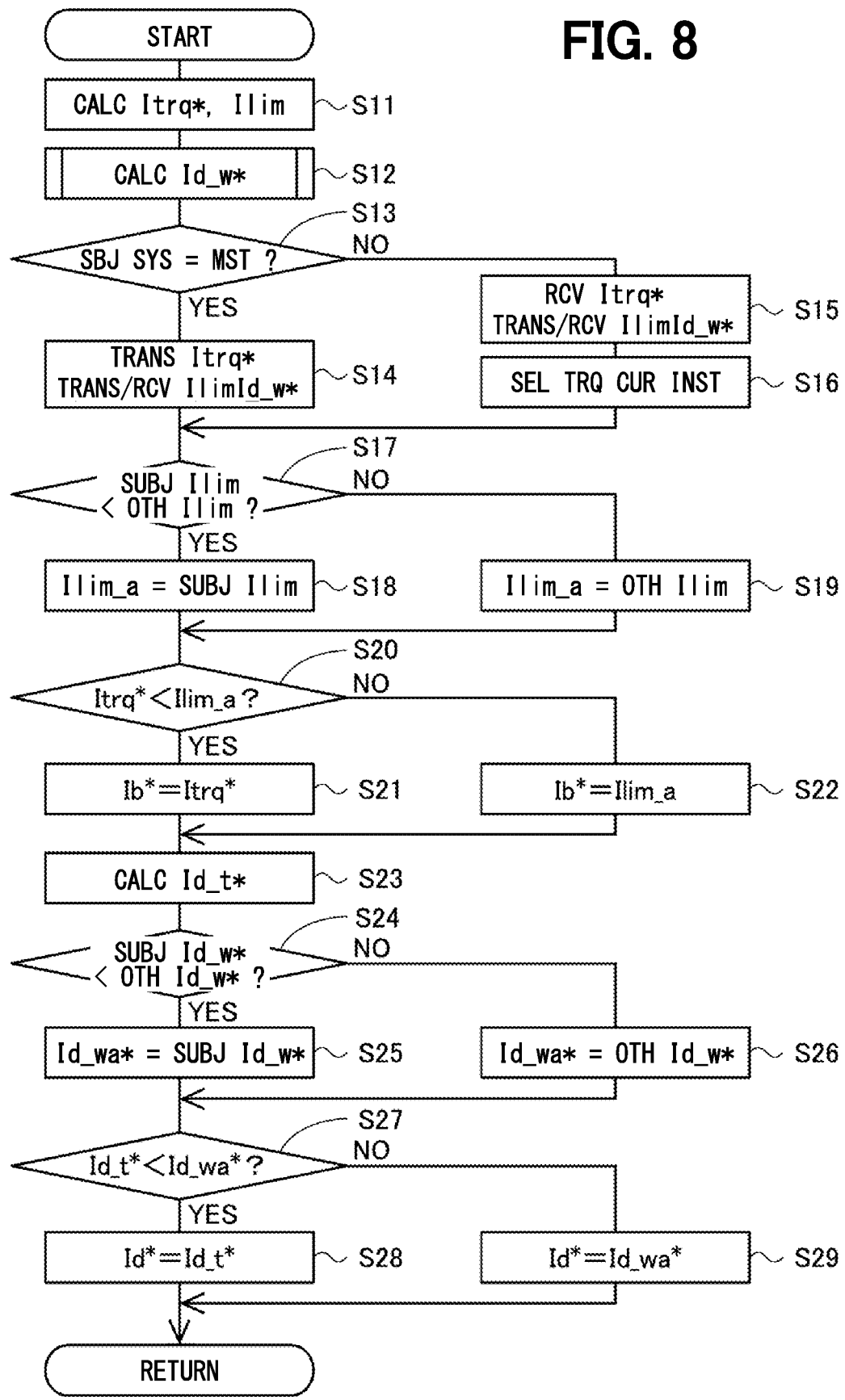
FIG. 8 is a flowchart illustrating a current instruction calculation process according to the first embodiment.
Figure 9:
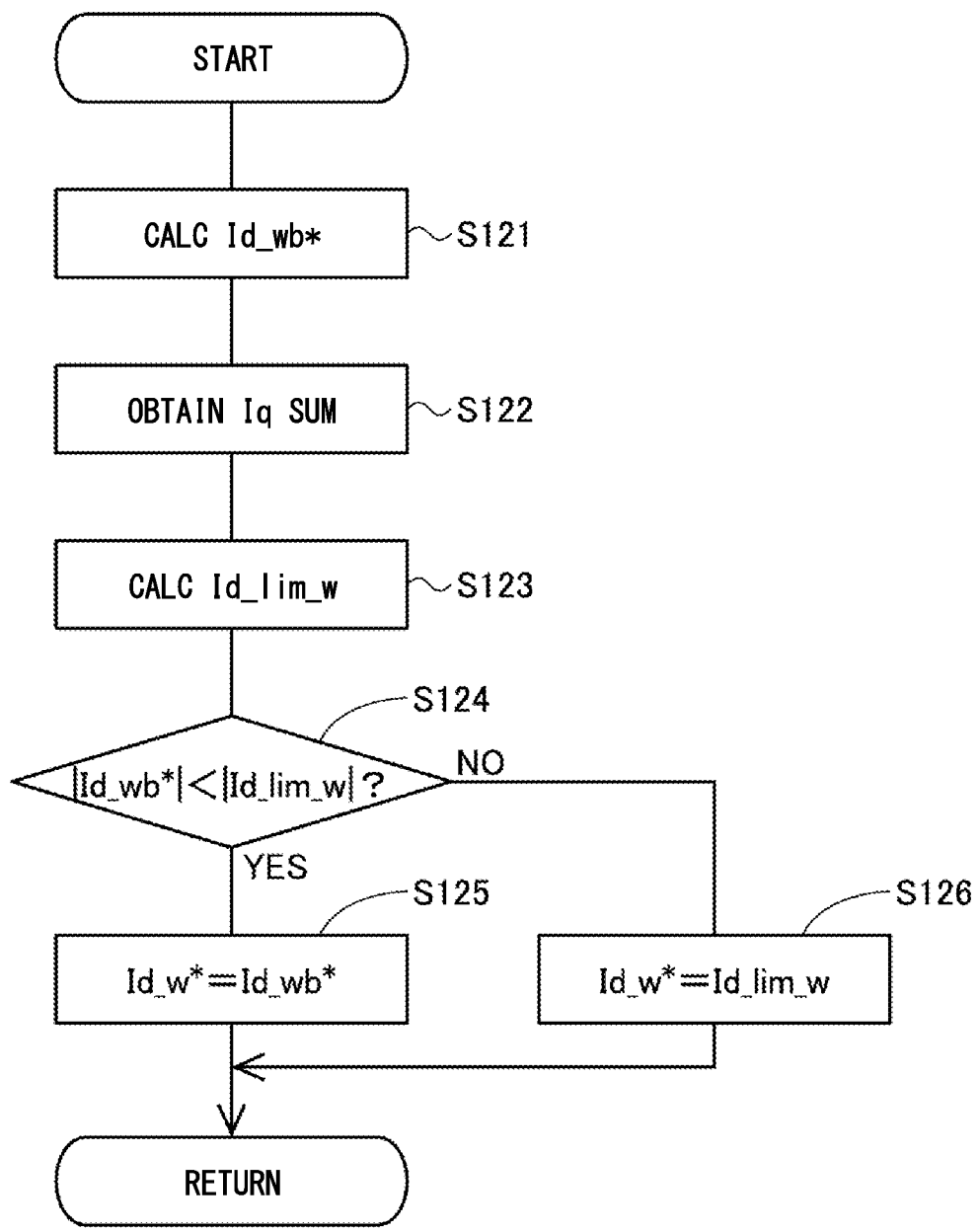
FIG. 9 is a flowchart illustrating a field-weakening d-axis current instruction calculation process according to the first embodiment.

The current instruction calculation process of the present embodiment is described based on the flowchart of FIG. 8. This process is performed at predetermined intervals by the control units 151 and 251, mainly shows the d-axis current instruction calculation. Hereinafter, in the phrase of step S11, "step" is dropped, and a symbol "S" is used. The same applies to the other steps. Since the processes after S11, S12, and S17 are common to the control units 151 and 251, they are basically described as control by the first control unit 151. Regarding the second control unit 251, a value of the subject system and a value of the other system may simply be replaced in the description regarding the first control unit 151. Regarding the control of the other embodiments, the control common to both of the control units 151 and 251 is described in the same manner. In the flowchart, the subscripts "1" and "2" indicating the system number are omitted, the value of the subject system is described as "SUBJ," and the value of the other system is described as "OTH."

In S11, the torque current instruction calculation unit 513 calculates the torque current instruction value Itrq1*, and the current limit calculation unit 515 calculates the current limit value Ilim1. In S12, the field-weakening calculation unit 521 calculates the field-weakening d-axis current instruction value Id_w1*. The field-weakening d-axis current instruction calculation process is described based on the subflow of FIG. 9.

In S121, the field-weakening calculation unit 521 calculates the pre-limit field-weakening d-axis current instruction value Id_wb1*. In S122, the field-weakening calculation unit 521 obtains the q-axis current sum Iq+ from the sum-difference calculation unit 508. In S123, the field-weakening d-axis current limit value Id_lim_w1 is calculated by map calculation (see FIG. 7) based on the q-axis current sum Iq+. The processing order of S121 and S122 and S123 may be switchable.

In S124, the field-weakening calculation unit 521 determines whether or not the absolute value of the pre-limit field-weakening d-axis current instruction value Id_wb1* is smaller than the absolute value of the field-weakening d-axis current limit value Id_lim_w1. When it is determined that the absolute value of the pre-limit field-weakening d-axis Id_wb1* is smaller than the absolute value of the field-weakening d-axis current limit value Id_lim_w1 (S124: YES), the process proceeds to S125, and the pre-limit field-weakening d-axis current instruction value Id_wb1* is set as the field-weakening d-axis current instruction value Id_w1*. When it is determined that the absolute value of the pre-limit field-weakening d-axis Id_wb1* is equal to or greater than the absolute value of the field-weakening d-axis current limit value Id_lim_w1 (S124: NO), the process proceeds to S126, and the field-weakening d-axis current limit value Id_lim_w1 is set as the field-weakening d-axis current instruction value Id_w1*.

Returning to FIG. 8, in S13, the control units 151 and 251 determine whether or not the subject system is a master system related to the current instruction value calculation. When it is determined that the subject system is a master system related to the current instruction value calculation (S13: YES), the process proceeds to S14, and when it is determined that the subject system is not the master system related to the current instruction value calculation (S13: NO), that is, when the subject system is a slave system related to the current instruction value calculation, the process proceeds to S15. In the present embodiment, since the first system L1 is the master and the second system L2 is the slave, the first control unit 151 in S13 makes an affirmative determination to proceed to S14, and the second control unit 251 in S13 makes a negative determination to proceed to S15. That is, the first control unit 151 performs the process of S14, and the second control unit 251 performs the process of S15 and S16. The same applies to S54 to S56 in FIGS. 13 and S88 to S90 in FIG. 15.

In S14 to which the process proceeds when the subject system is a master system, the first control unit 151 transmits the torque current instruction value Itrq1*, and transmits and receives the current limit values Ilim1, Ilim2, and the field-weakening d-axis current instruction values Id_w1*, Id_w2*. In S15 to which the process proceeds when the subject system is a slave system, the second control unit 251 receives the torque current instruction value Itrq1* of the master system, and transmits and receives the current limit values Ilim1, Ilim2, and the field-weakening d-axis current instruction values Id_w1*, Id_w2*. Although not shown in the flowchart, in S14 and S15, the current detection values Id1, Iq1, Id2, and Iq2 of the dq-axes are transmitted simultaneously. Instead of the current detection value on the dq-axes, three-phase current detection values may be transmitted and the dq conversion may be performed on the receiving side. The same applies to S33, S54, S55, and S73 described later.

In S16, the second control unit 251 selects a torque current instruction used for control. In the present embodiment, when the inter-microcomputer communication is normal, the drive of the first system L1 as the master system is normal, and the difference between the torque current instruction values Itrq1* and Itrq2* is equal to or smaller than the torque instruction abnormality determination threshold, the master system torque current instruction value Itrq1* is selected as the torque current instruction value to be used for control. Further, when the inter-microcomputer communication is abnormal, the first system L1 is not operating normally, or the difference between the torque current instruction values Itrq1* and Itrq2* is greater than the torque instruction abnormality determination threshold, the torque current instruction value Itrq2* of the subject system is selected as the torque current instruction value used for control.

In S17, the current limit arbitration unit 516 determines whether or not the current limit value Ilim1 of the subject system is smaller than the current limit value Ilim2 of the other system. When it is determined that the current limit value Ilim1 of the subject system is smaller than the current limit value Ilim2 of the other system (S17: YES), the process proceeds to S18, and the current limit value Ilim1 of the subject system is set as the post-arbitration current limit value Ilim_a1. When it is determined that the current limit value Ilim1 of the subject system is equal to or greater than the current limit value Ilim2 of the other system (S17: NO), the process proceeds to S19, and the current limit value Ilim2 of the other system is set as the post-arbitration current limit value Ilim_a1.

In S20, the current limit unit 517 determines whether the torque current instruction value Itrq1* is smaller than the post-arbitration current limit value Ilim_a1. When it is determined that the torque current instruction value Itrq1* is smaller than the post-arbitration current limit value Ilim_a1 (S20: YES), the process proceeds to S21, and the torque current instruction value Itrq1* is set as the basic current instruction value Ib1*. When it is determined that the torque current instruction value Itrq1* is equal to or greater than the post-arbitration current limit value Ilim_a1 (S20: NO), the process proceeds to S22, and the post-arbitration current limit value Ilim_a1 is set as the basic current instruction value Ib1*.

In S23, the torque d-axis current instruction calculation unit 519 calculates the torque d-axis current instruction value Id_t1*. The calculation of the torque d-axis current instruction value Id_t1* may be performed at any timing up to S27 after the calculation of the basic current instruction value Ib1*, and the step order can be arbitrarily changed as appropriate.

In S24, the field-weakening d-axis current instruction arbitration unit 522 determines whether or not the field-weakening d-axis current instruction value Id_w1* of the subject system is smaller than the field-weakening d-axis current instruction value Id_w2* of the other system. When it is determined that the field-weakening d-axis current instruction value Id_w1* of the subject system is smaller than the field-weakening d-axis current instruction value Id_w2* of the other system (S24: YES), the process proceeds to S25, and the field-weakening d-axis current instruction value Id_w1* of the subject system is set as the post-arbitration field-weakening d-axis current instruction value Id_wa1*. When it is determined that the field-weakening d-axis current instruction value Id_w1* of the subject system is equal to or greater than the field-weakening d-axis current instruction value Id_w2* of the other system (S24: NO), the process proceeds to S26, and the field-weakening d-axis current instruction value Id_w2* of the other system is set as the post-arbitration field-weakening d-axis current instruction value Id_wa1*.

In S27, the d-axis current instruction calculation unit 625 determines whether or not the torque d-axis current instruction value Id_t1* is smaller than the post-arbitration field-weakening d-axis current instruction value Id_wa1*. When it is determined that the torque d-axis current instruction value $Id\_t1^*$ is smaller than the post-arbitration field-weakening d-axis current instruction value $Id\_wa1^*$ (S27: YES), the process proceeds to S28, and the torque d-axis current instruction value $Id\_t1^*$ is set as the d-axis current instruction value is $Id1^*$. When it is determined that the torque d-axis current instruction value $Id\_t1^*$ is equal to or greater than the post-arbitration field-weakening d-axis current instruction value $Id\_wa1^*$ (S27: NO), the process proceeds to S29, and the post-arbitration field-weakening d-axis current instruction value $Id\_wa1^*$ is set as the d-axis current instruction value $Id1^*$. The calculated d-axis current instruction value $Id1^*$ is used for the q-axis current instruction calculation and the current control calculation.

In the present embodiment, the torque current instruction value $Itrq1^*$ of the master system is used in all systems, and the current limit values Ilim1, Ilim2 and the field-weakening d-axis current instruction values $Id\_w1^*$, $Id\_w2^*$ are shared among the systems. In such manner, the "final" values, i.e., the d-axis current instruction values $Id1^*$ and $Id2^*$ and the q-axis current instruction values $Iq1^*$ and $Iq2^*$ used in the current control calculation units 530 and 630 of the respective systems, are respectively matched, i.e., are made even, thereby the control scheme of the present disclosure can be suitably applied to an IPM (i.e., Interior Permanent Magnet) motor in which the torque is generated by the d-axis current.

Sharing of the various values among the systems can be achieved by transmitting and receiving the values when, i.e., in the course of, sharing the current detection values, and the final d-axis current instruction values $Id1^*$, $Id2^*$ and the final q-axis current instruction values $Iq1^*$, $Iq2^*$ are respectively calculated in each of those systems, i.e., system to system. In such manner, the number of bidirectional communications in one cycle of current control is reducible to one communication without degrading controllability, thereby reducing the calculation load compared to the plural number of communications for such control.

As described above, the ECU 10 controls the driving of the motor 80 having the motor windings 180 and 280, and includes a plurality of control units 151 and 251 that can communicate with each other. The control units 151 and 251 include the basic instruction calculation units 512 and 612, the field-weakening calculation units 521 and 621, and a signal generator. In the present embodiment, the current control calculation units 530 and 630 and the PWM output units 555 and 655 correspond to the "signal generator," and a PWM signal is generated as a drive signal based on the d-axis current instruction values $Id1^*$ and $Id2^*$ and the q-axis current instruction values $Iq1^*$ and $Iq2^*$ that are respectively calculated based on the basic current instruction values $Ib1^*$ and $Ib2^*$ and the field-weakening d-axis current instruction values $Id\_w1^*$ and $Id\_w2^*$.

In the present embodiment, at least a part of the instruction values used for generating the PWM signal is shared by the plurality of control units 151 and 251. Thereby, compared with an independent control in which the instruction value is not shared by the plural control units, an error between systems (i.e., an inter-system error) is reducible, and the driving of the motor 80 is appropriately controllable by taking the d-axis current into consideration.

The d-axis current instruction calculation units 525 and 625 calculate the d-axis current instruction values $Id1^*$ and $Id2^*$ based on (i) the torque d-axis current instruction values $Id\_t1^*$ and $Id\_t2^*$ that are calculated based on the basic current instruction values $Ib1^*$ and $Ib2^*$ and (ii) the field-weakening current instruction value. In the present embodiment, the smaller one of (i) the torque d-axis current instruction value $Id\_t1^*$, $Id\_t2^*$ or (ii) the field-weakening current instruction values, which are respectively a value related to the d-axis, are selected as the d-axis current instruction values $Id1^*$, $Id2^*$.

In the present embodiment, the field-weakening d-axis current instruction values $Id\_w1^*$ and $Id\_w2^*$ are shared by the plurality of control units 151 and 251, and the field-weakening d-axis current instruction arbitration units 522 and 622 calculate the post-arbitration field-weakening d-axis current instruction values $Id\_wa1^*$ and $Id\_wa2^*$ based on the shared field-weakening d-axis current instruction values $Id\_w1^*$ and $Id\_w2^*$. In the present embodiment, the smaller one of the field-weakening d-axis current instruction values $Id\_w1^*$ and $Id\_w2^*$ is selected as the post-arbitration field-weakening d-axis current instruction values $Id\_wa1^*$ and $Id\_wa2^*$. The d-axis current instruction calculation units 525 and 625 use the post-arbitration field-weakening d-axis current instruction values $Id\_wa1^*$ and $Id\_wa2^*$ as the "field-weakening current instruction values." Thereby, the d-axis current can be made even among the different systems. Further, since the final d-axis current instruction values $Id1^*$ and $Id2^*$ used for generating the drive signal are calculated by the respective control units 151 and 251, i.e., system to system, the calculation load is reducible without degrading the controllability, in comparison to the case where the final d-axis current instruction values $Id1^*$ and $Id2^*$ are shared (i.e., calculated in one system and transmitted to the other).

The first control unit 151 transmits the torque current instruction value $Itrq1^*$ corresponding to the torque instruction value $Trq1^*$ as a master torque current instruction value to the second control unit 251, and the second control unit 251 calculates the basic current instruction value $Ib2^*$ (i) based on the torque current instruction value $Itrq1^*$ when the torque current instruction value $Itrq1^*$ is normal, and (ii) based on the torque current instruction value $Itrq2^*$ calculated by itself, i.e., by the control unit 251, when the torque current instruction value $Itrq1^*$ is not reliable.

Here, "when the torque current instruction value is not reliable" means at least one of (i) the torque current instruction value cannot be obtained due to a communication error or the like, (ii) the system related to the master control unit is stopped due to abnormality, and (iii) the difference of the torque current instruction value (e.g., $Itrq1^*$) from the instruction value of the subject system (e.g., $Itrq2^*$) is greater than the abnormality determination threshold. The reliability of the torque current instruction value may also be determined by using other information. The same applies to the d-axis current instruction value in the fourth embodiment.

In such manner, the torque current instruction values at the normal time can be made even among the different systems, and the drive control of the motor 80 can be continued even when the master torque current instruction value is not reliable.

In the present embodiment, in particular, the torque current instruction value $Itrq1^*$ is shared by being transmitted from the first control unit 151 to the second control unit 251, and the field-weakening d-axis current instruction values $Id\_w1^*$ and $Id\_w2^*$ are mutually transmitted and received for the sharing. In addition to the sharing of the torque current instruction value $Itrq1^*$, by sharing the field-weakening d-axis current instruction values $Id\_w1^*$ and $Id\_w2^*$, the torque outputs from the plural, i.e., different, systems can be made even even in the IPM motor that generates torque by the d-axis current.

The field-weakening calculation units 521 and 621 calculate the field-weakening d-axis current limit values Id_lim_w1 and Id_lim_w2 based on the q-axis current sum Iq+ that is the sum of the q-axis currents of the plurality of motor windings 180 and 280, and when the absolute values of the pre-limit field-weakening d-axis current instruction values Id_wb1* and Id_wb2* are equal to or greater than the absolute values of the field-weakening d-axis current limit values Id_lim_w1 and Id_lim_w2, each of the field-weakening current instruction values is set, i.e., is limited, to the field-weakening d-axis current, i.e., to Id_lim_w1 and Id_lim_w2, respectively. Further, the field-weakening calculation units 521 and 621 switch the calculation of the field-weakening d-axis current limit values Id_lim_w1 and Id_lim_w2 according to the basic current instruction values Ib1* and Ib2*. In the present embodiment, the map used for such calculation is switched according to the basic current instruction values Ib1* and Ib2*. Thereby, the field-weakening current instruction value is appropriately calculable.

Second Embodiment

Figure 10:
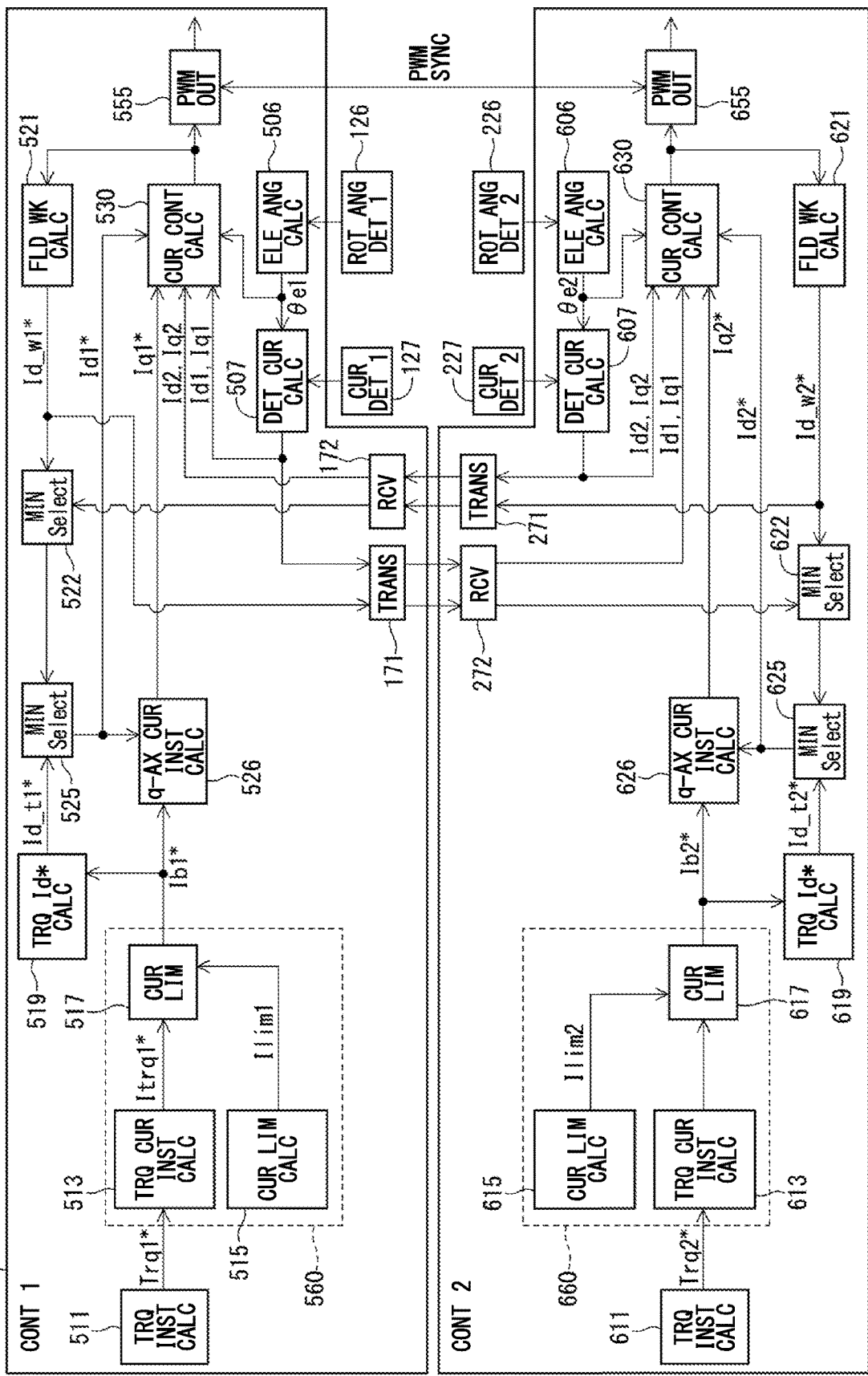
FIG. 10 is a block diagram illustrating the first control unit and the second control unit according to a second embodiment.
Figure 11:
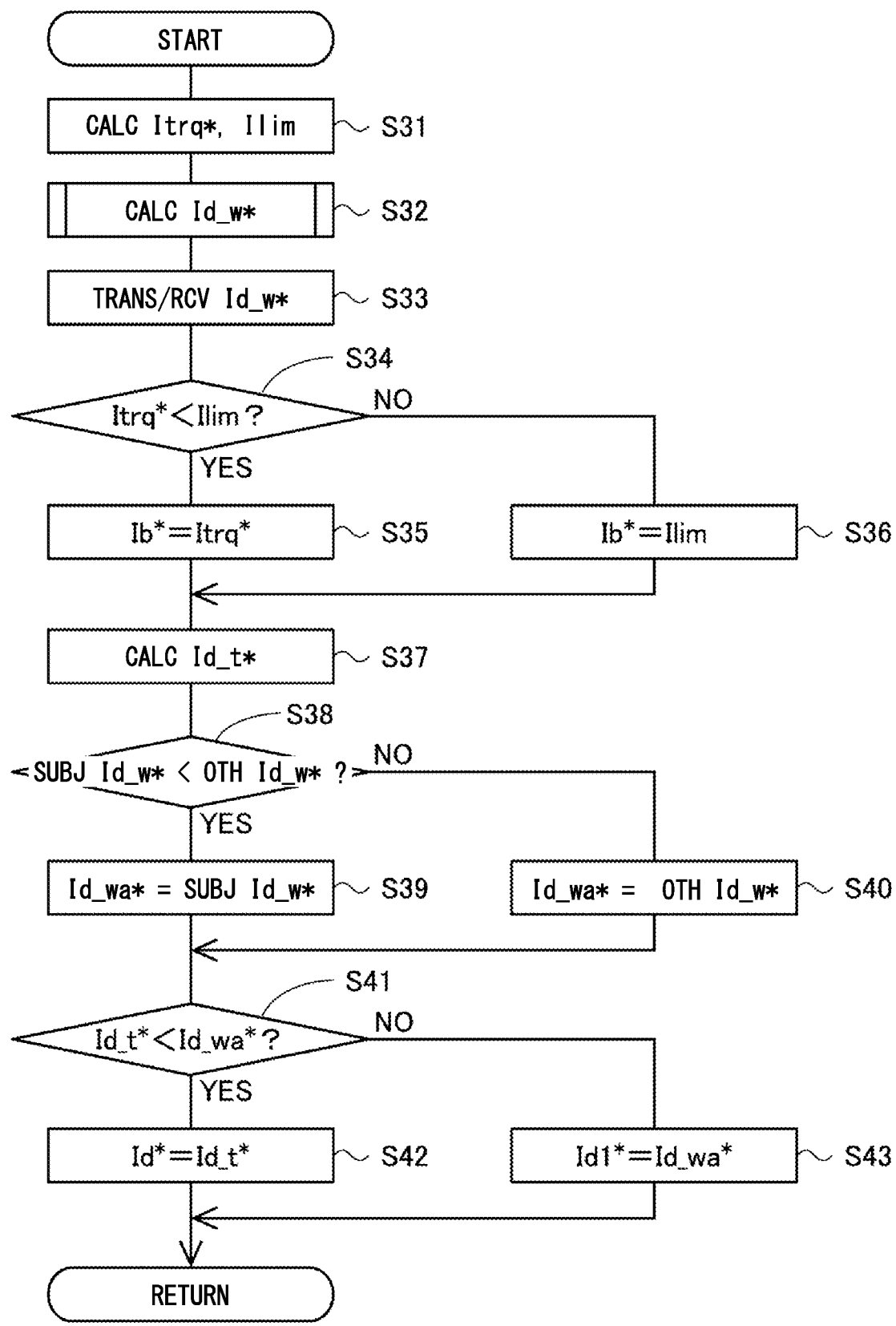
FIG. 11 is a flowchart illustrating the current instruction calculation process according to the second embodiment.

The second embodiment is illustrated in FIG. 10 and FIG. 11. As shown in FIG. 10, control units 152 and 252 of the present embodiment are different from the above-described embodiment, by including basic instruction calculation units 560 and 660. The basic instruction calculation unit 560 includes the torque current instruction calculation unit 513, the current limit calculation unit 515, and the current limit unit 517. The basic instruction calculation unit 660 includes the torque current instruction calculation unit 613, the current limit calculation unit 615, and the current limit unit 617.

In the present embodiment, since (i) the torque current instruction value Itrq1* is not transmitted from the first control unit 152 to the second control unit 252 and (ii) the current limit values Ilim1 and Ilim2 are not transmitted and received, the switching unit 614 and the current limit arbitration units 516 and 616 are omitted. That is, in the present embodiment, the field-weakening d-axis current instruction values Id_w1* and Id_w2* are shared and arbitrated, and the torque current instruction value Itrq1* and the current limit values Ilim1 and Ilim2 are not shared among the systems.

The current instruction calculation process of the present embodiment is described based on the flowchart of FIG. 11. The processes in S31 and S32 are similar to the processes in S11 and S12 in FIG. 8. In S33, the control units 152 and 252 transmit and receive the field-weakening d-axis current instruction values Id_w1* and Id_w2*. The processes of S34 to S43 are similar to the processes of S20 to S29 in FIG. 8.

In the present embodiment, the field-weakening d-axis current instruction values Id_w1* and Id_w2* are shared among the systems by one communication in the course of sharing the current detection values. Therefore, if the post-arbitration field-weakening d-axis current instruction values Id_wa1* and Id_wa2* are selected by the d-axis current instruction calculation units 525, 625, for example, the d-axis current instruction values Id1* and Id2* can be made even. Further, effects similar to those of the embodiment described above are also achievable.

Third Embodiment

Figure 12:
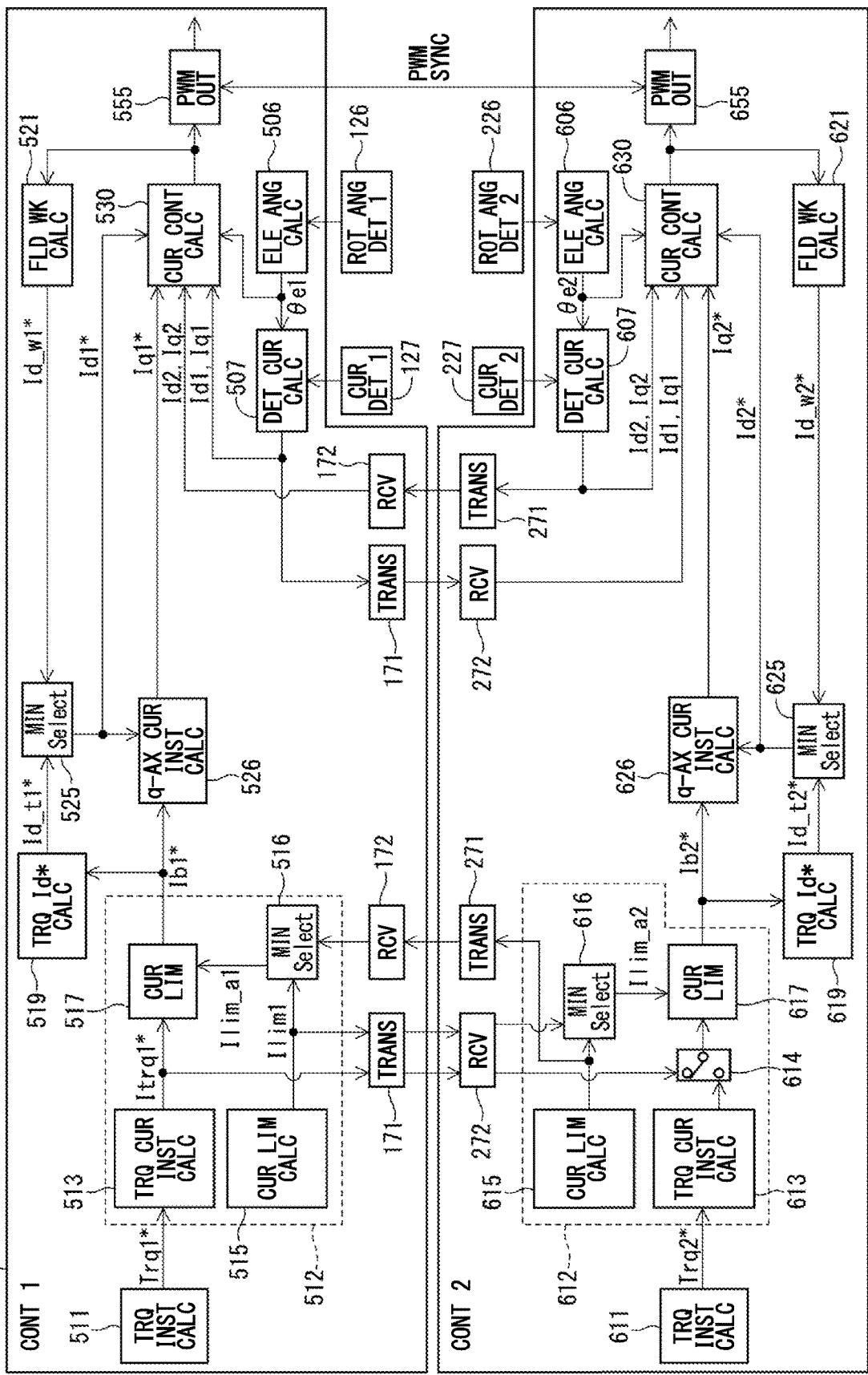
FIG. 12 is a block diagram illustrating the first control unit and the second control unit according to a third embodiment.
Figure 13:
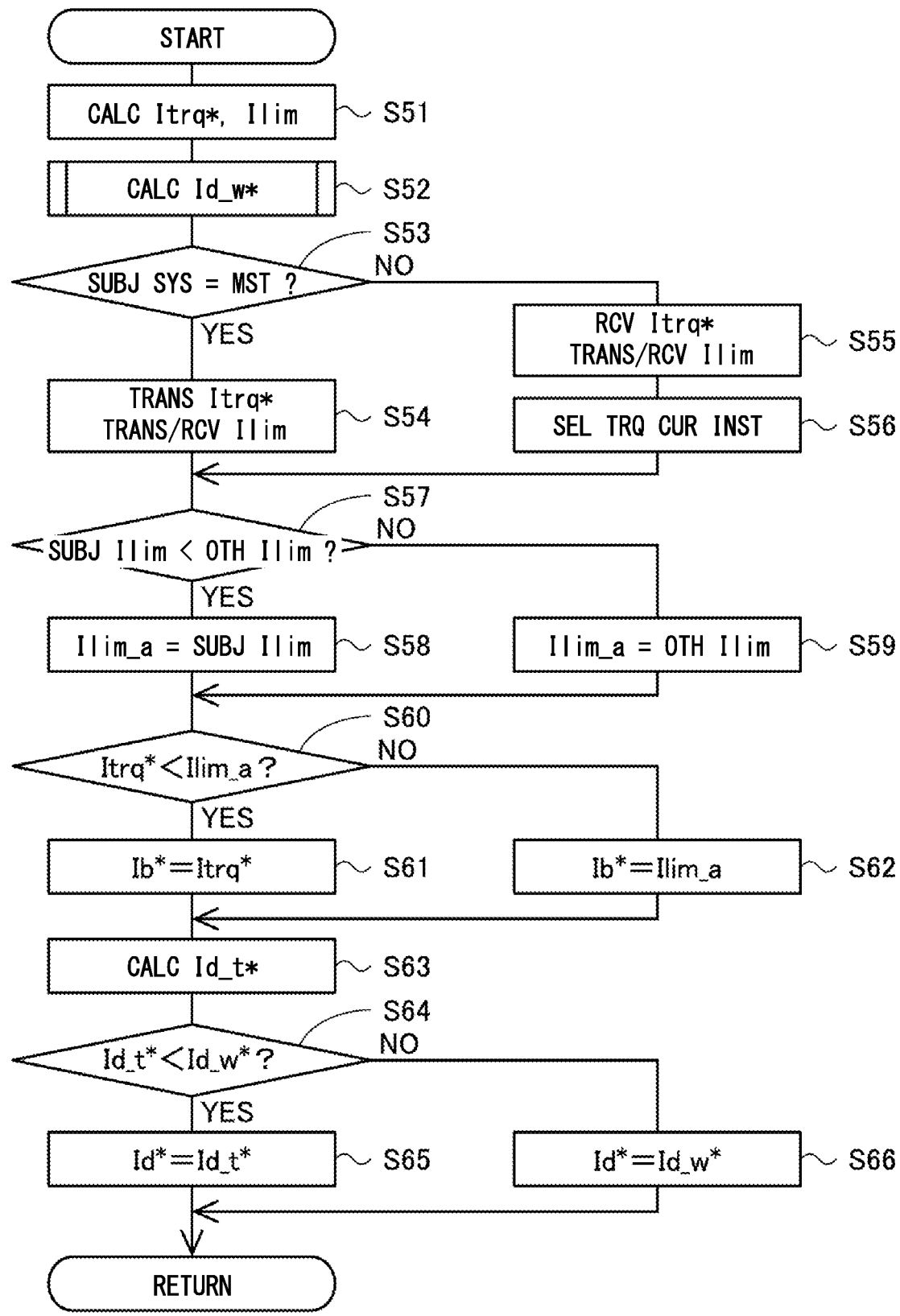
FIG. 13 is a flowchart illustrating the current instruction calculation process according to the third embodiment.

The third embodiment is illustrated in FIG. 12 and FIG. 13. In control units 153 and 253 of the present embodiment, the field-weakening d-axis current instruction values Id_w1* and Id_w2* are not shared, and the field-weakening d-axis current instruction arbitration units 522 and 622 are omitted. Except for such points, the control units 153 and 253 are the same as the control units 151 and 251 of the first embodiment.

The current instruction calculation process of the present embodiment is described based on the flowchart of FIG. 13. The processes of S51 to S53 are similar to the processes of S11 to S13 in FIG. 8. In S54 to which the process proceeds when the subject system is a master system, the first control unit 153 transmits the torque current instruction value Itrq1*, and transmits and receives the current limit values Ilim1 and Ilim2. In S55 to which the process proceeds when the subject system is a slave system, the torque current instruction value Itrq1* is received and the current limit values Ilim1 and Ilim2 are transmitted and received.

S56 to S63 are the same as S16 to S23 in FIG. 8. In S64, the d-axis current instruction calculation unit 525 determines whether the torque d-axis current instruction value Id_t1* is smaller than the field-weakening d-axis current instruction value Id_w1*. When it is determined that the torque d-axis current instruction value Id_t1* is smaller than the field-weakening d-axis current instruction value Id_w1* (S64: YES), the process proceeds to S65, and the torque d-axis current instruction value Id_t1* is set as the d-axis current instruction value Id1*. When it is determined that the torque d-axis current instruction value Id_t1* is equal to or greater than the field-weakening d-axis current instruction value Id_w1* (S64: NO), the process proceeds to S66 and the field-weakening d-axis current instruction value Id_w1* is set as the d-axis current instruction value Id1*.

In the present embodiment, the torque current instruction values Itrq1* and Itrq2* are shared among the systems by one communication in the course of sharing the current detection values. Therefore, if the motor 80 is an SPM motor, the q-axis current instruction values Iq1* and Iq2* can be made even. Further, effects similar to those of the embodiments described above are also achievable.

Fourth Embodiment

Figure 14:
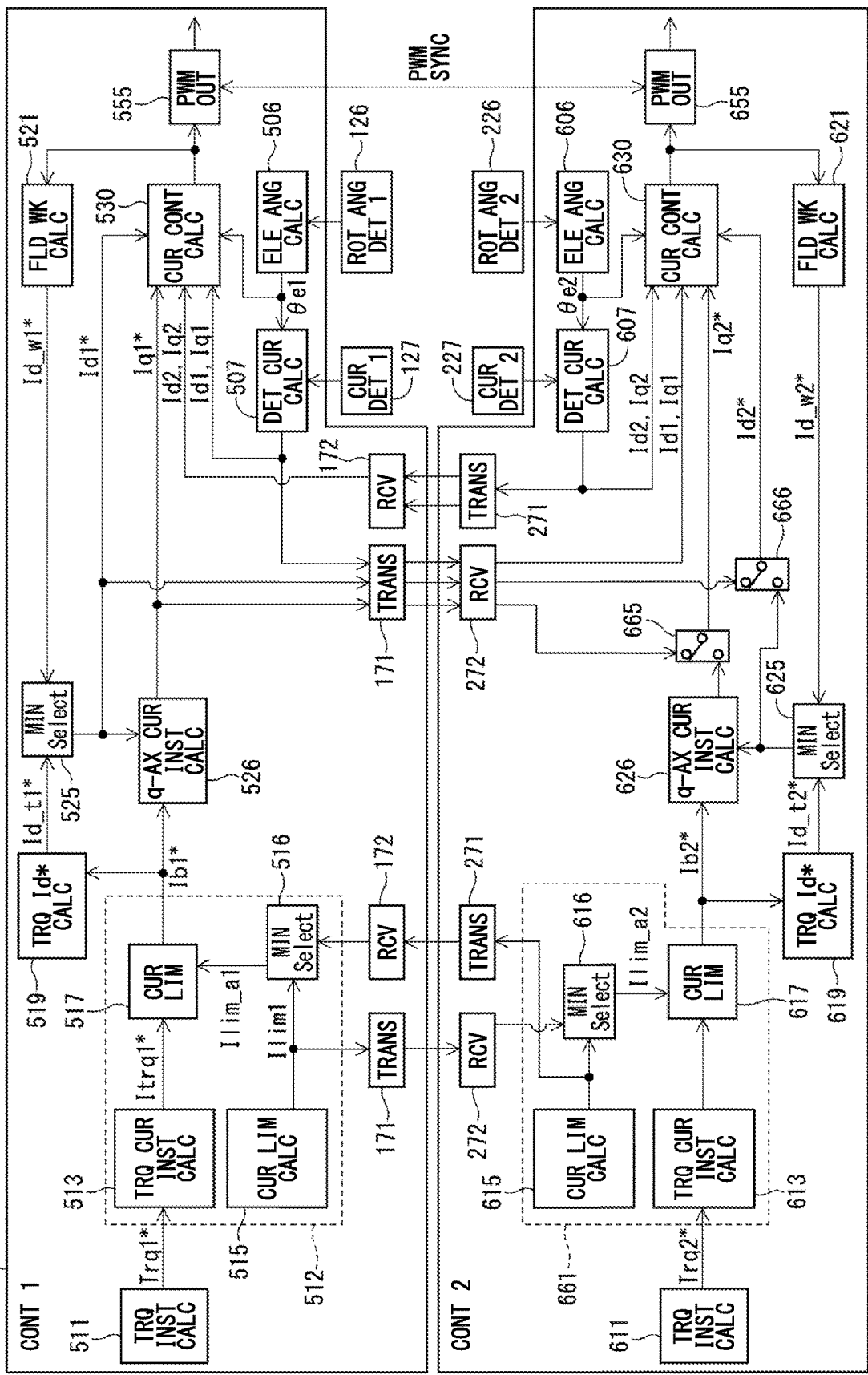
FIG. 14 is a block diagram illustrating the first control unit and the second control unit according to a fourth embodiment.
Figure 15:
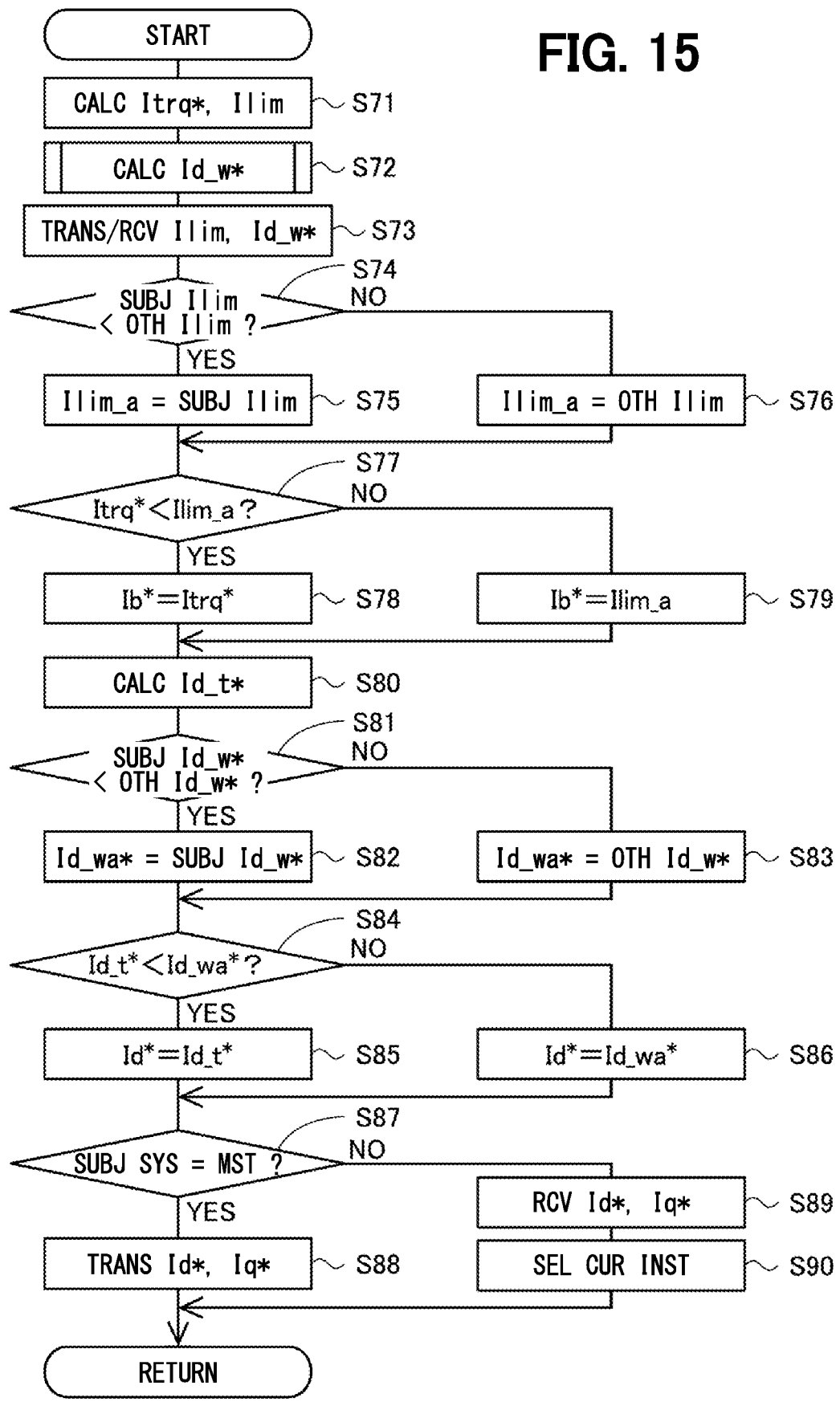
FIG. 15 is a flowchart illustrating the current instruction calculation process according to the fourth embodiment.

The fourth embodiment is illustrated in FIG. 14 and FIG. 15. A first control unit 154 of the present embodiment transmits the final d-axis current instruction value Id1* and the final q-axis current instruction value Iq1* to a second control unit 254, instead of transmitting the torque current instruction value Itrq1*, which is the point different from the first control unit 153 of the third embodiment.

A basic instruction calculation unit 661 of the second control unit 254 is different from the basic instruction calculation unit 612 of the above embodiment in that the switching unit 614 is omitted. In the present embodiment, since the torque current instruction value Itrq1* is not transmitted from the first control unit 154, the current limit unit 617 uses the torque current instruction value Itrq2* of the subject system.

Further, the second control unit 254 obtains the final d-axis current instruction value Id1* and the final q-axis current instruction value Iq1*, instead of obtaining the torque current instruction value Itrq1*, and includes switching units 665 and 666. The switching unit 665 is capable of switching the q-axis current instruction values Iq1* and Iq2* used in the current control calculation unit 630. The switching unit 666 is capable of switching the d-axis current instruction values Id1* and Id2* used in the current control calculation unit 630.

In the present embodiment, when the first control unit 154 is a master and the second control unit 254 is a slave and the dq-axes current instruction values Id1* and Iq1* of the master system are normal, the dq-axes current instruction values Id1*, Iq1* are preferentially used, i.e., are used in a prioritized manner. Also, when the dq-axes current instruction values Id1* and Iq1* of the master system are not reliable, i.e., when the dq-axes current instruction values Id1* and Iq1* of the master system cannot be obtained due to a failure or the like or when the difference between the dq-axes current instruction values Id1*, Iq1* and Id2*, Iq2* of the master system is greater than the abnormality determination threshold, the dq-axes current instruction values Id2* and Iq2* of the subject system are used.

The current instruction calculation process of the present embodiment is described based on the flowchart of FIG. 15. The processes in S71 and S72 are similar to the processes in S11 and S12 in FIG. 8. In S73, the control units 154 and 254 transmit and receive the current limit values Ilim1 and Ilim2 and the field-weakening d-axis current instruction values Id_w1* and Id_w2*. The processes of S74~S86 are similar to the processes of S17~S29 in FIG. 8.

The process of S87 is the same as the process of S13 in FIG. 8, that is, when it is determined that the subject system is a master system (S87: YES), the process proceeds to S88, and when it is determined that the subject system is a slave system (S87: NO), the process proceeds to S89.

In S88 to which the process proceeds when the subject system is a master system, the first control unit 154 transmits the dq-axes current instruction values Id1* and Iq1* to the second control unit 254. In S89 to which the process proceeds when the subject system is a slave system, the second control unit 254 receives the dq-axes current instruction values Id1* and Iq1* from the first control unit 154.

In S90, the second control unit 254 selects a dq-axes current instruction used for current control. In the present embodiment, when (i) the inter-microcomputer communication is normal, (ii) the driving of the first system L1, which is the master system, is normal, (iii) the difference between the d-axis current instruction values Id1* and Id2* is equal to or less than a d-axis abnormality determination threshold and the difference between the q-axis current instruction values Iq1* and Iq2* is equal to or less than a q-axis abnormality determination threshold, the dq-axes current instruction values Id1* and Iq1* of the master system are selected as the current instructions used for the calculation in the current control calculation unit 630. Also, when (i) the inter-microcomputer communication is abnormal, (ii) the first system L1 is not operating normally, (iii) the difference between the d-axis current instruction values Id1* and Id2* is greater than the d-axis abnormality determination threshold or the difference between the q-axis current instruction values Iq1* and Iq2* is greater than the q-axis abnormality determination threshold, the dq-axes current instruction values Id2* and Iq2* of the subject system are selected as the current instructions used for the calculation in the current control calculation unit 630.

In the present embodiment, the first control unit 154 transmits, to the second control unit 254, the d-axis current instruction value Id1* as the master d-axis current instruction value and the q-axis current instruction value Iq1* as the master q-axis current instruction value. When the dq-axes current instruction values Id1* and Iq1* are normal, the second control unit 254 generates a drive signal using the dq-axes current instruction values Id1* and Iq1*, and when the dq-axes current instruction values Id1* and Iq1* are not reliable, the second control unit 254 generates a drive signal using the dq-axes current instruction values Id2* and Iq2* calculated by itself, i.e., by the control unit 254.

In the present embodiment, since the final dq-axes current instruction values Id1* and Iq1* are transmitted from the master to the slave, the torque outputs from the respective systems can be made even in the normal state. Further, even when the master side dq-axes current instruction values Id1* and Iq1* are not reliable, the drive control is continuable by using the dq-axes current instruction values Id2* and Iq2* calculated on the slave side. Further, effects similar to those of the embodiments described above are also achievable.

In the above embodiment(s), the ECU 10 corresponds to a "rotating electric machine control device," the motor 80 corresponds to a "rotating electric machine," the current control calculation units 530 and 630 and the PWM output units 555 and 655 correspond to a "signal generator," and the PWM signal corresponds to a "drive signal." Further, the first control units 151 to 154 and the second control units 251 to 254 correspond to a "control unit," the first control units 151 to 154 correspond to a "master control unit," and the second control units 251 to 254 correspond to a "slave control unit," the torque current instruction value Itrq1* corresponds to a "master torque current instruction value," the d-axis current instruction value Id1* corresponds to a "master d-axis current instruction value," and the q-axis current instruction value Iq1* corresponds to a "master q-axis current instruction value."

Other Embodiments

In the above embodiments, two control units are provided. In other embodiments, the number of control units may be three or more. For example, in a master-slave configuration as shown in the first embodiment, one control unit is a master control unit, and the remaining control units are slave control units. In the above embodiments, the field-weakening d-axis current instruction arbitration unit calculates the field-weakening d-axis current instruction value by the minimum selection. In other embodiments, the arbitration calculation is not limited to the minimum selection, that is, for example, a calculation value such as an average value may also be used as a field-weakening d-axis current instruction value. The same applies to the other calculation processes that are described as the minimum selection.

In the above embodiments, two motor windings and two inverter units are provided. In other embodiments, there may be one or more motor windings and inverter units. Further, for example, one control unit may be provided for a plurality of motor windings and inverter units, or a plurality of control units may be provided for one inverter unit and motor windings. That is, the number of control units and the number of motor windings and inverter units may be respectively different.

In the above embodiments, the rotating electric machine is a three-phase brushless IPM motor. In other embodiments, the rotating electric machine is not limited to the IPM motor, but may also be an SPM (i.e., Surface Permanent Magnet) motor. The rotating electric machine is not limited to a brushless motor, but may also be a so-called motor generator that provides a generator function in addition. Further, in the above embodiments, a rotating electric machine control device is applied to an electric power steering device. In other embodiments, the rotating electric machine control device may be applied to a device other than the electric power steering device that controls steering, such as a steer-by-wire device or the like.

The control units and the methods thereof described in the present disclosure may be implemented by using a special-purpose computer which is configured with a memory and a processor programmed to execute one or more particular functions embodied as computer programs stored in the memory. Alternatively, the control units described in the present disclosure and the method thereof may also be realized by a dedicated computer configured as a processor having one or more dedicated hardware logic circuits. Alternatively, the control units and the method thereof described in the present disclosure may further be realized by one or more dedicated computers, which is may be a combination of (i) a processor and a memory, which are programmed to perform one or more functions and (ii) a processor which is configured with one or more hardware logic circuits. Further, the computer programs may be stored, as instructions to be performed by a computer, in a tangible, non-transitory computer-readable medium. The present disclosure is not limited to the above embodiments, but various modifications therefrom may also be implemented without departing from the spirit of the present disclosure.

What is claimed is:

1. A rotating electric machine control device for controlling driving of a rotating electric machine having a plurality of motor windings, comprising:
a plurality of control units capable of communicating with each other, the respective control units include:
a basic instruction calculation unit configured to calculate a basic current instruction value based on a torque instruction value;
a field-weakening calculation unit configured to calculate a field-weakening current instruction value; and
a signal generator configured to generate a drive signal based on a d-axis current instruction value and a q-axis current instruction value calculated based on the basic current instruction value and the field-weakening current instruction value, wherein
at least a part of the instruction values used for generating the drive signal is shared by the plurality of control units, wherein
the control unit includes a d-axis current instruction calculation unit configured to calculate the d-axis current instruction value based on (i) a torque d-axis current instruction value calculated based on the basic current instruction value and (ii) the field-weakening current instruction value, and
the d-axis current instruction calculation unit selects a smaller one of the torque d-axis current instruction value and the field-weakening current instruction value as the d-axis current instruction value.

2. The rotating electric machine control according to claim 1, wherein
the field-weakening current instruction value calculated by the respective control unit is shared by the plurality of control units as the instruction value,
the control unit includes a field-weakening d-axis current instruction arbitration unit that calculates a post-arbitration field-weakening d-axis current instruction value based on the shared field-weakening current instruction value, and
the d-axis current instruction calculation unit uses the post-arbitration field-weakening d-axis current instruction value as the field-weakening current instruction value.

3. The rotating electric machine control according to claim 1, wherein
when one of the plurality of control units is a master control unit and the control unit(s) other than the master control unit is or are respectively a slave control unit, the master control unit transmits a master torque current instruction value, which is a torque current instruction value according to the torque instruction value, to the slave control unit as the instruction value, and
the slave control unit
calculates the basic current instruction value based on the master torque current instruction value when it is determined that the master torque current instruction value is normal, or
calculates the basic current instruction value based on the torque current instruction value calculated by itself when the master torque current instruction value is determined to be unreliable.

4. The rotating electric machine control according to claim 1, wherein
when one of the plurality of control units is a master control unit and the control unit(s) other than the master control unit is or are respectively a slave control unit, the master control unit transmits the d-axis current instruction value and the q-axis current instruction value calculated by the master control unit as the instruction values to the slave control unit, and
the slave control unit
generates the drive signal using the master d-axis current instruction value and the q-axis current instruction value when it is determined that the master d-axis current instruction value that is a d-axis current instruction value transmitted from the master control unit and the master q-axis current instruction value that is a q-axis current instruction value transmitted from the master control unit are normal, or
generates the drive signal using the d-axis current instruction value and the q-axis current instruction value calculated by itself when it is determined that the master d-axis current instruction value and the master q-axis current instruction value are not reliable.

5. The rotating electric machine control device according to claim 1, wherein
the field-weakening calculation unit
calculates a field-weakening d-axis current limit value based on a q-axis current sum that is a sum of q-axis currents of the plurality of motor windings, and
limits the field-weakening d-axis current instruction value to the field-weakening d-axis current limit value when an absolute value of a pre-limit field weakening d-axis current instruction value is equal to or greater than an absolute value of the field-weakening d-axis current limit value.

6. The rotating electric machine control device according to claim 5, wherein
the field-weakening calculation unit switches calculation of the field-weakening d-axis current limit value according to the basic current instruction value.

7. A rotating electric machine control device for controlling driving of a rotating electric machine having a plurality of motor windings, comprising:
a plurality of control units capable of communicating with each other, the respective control units include:
a basic instruction calculation unit configured to calculate a basic current instruction value based on a torque instruction value;
a field-weakening calculation unit configured to calculate a field-weakening current instruction value; and
a signal generator configured to generate a drive signal based on a d-axis current instruction value and a q-axis current instruction value calculated based on the basic current instruction value and the field-weakening current instruction value, wherein at least a part of the instruction values used for generating the drive signal is shared by the plurality of control units, wherein when one of the plurality of control units is a master control unit and the control unit(s) other than the master control unit is or are respectively a slave control unit, the master control unit transmits a master torque current instruction value, which is a torque current instruction value according to the torque instruction value, to the slave control unit as the instruction value, and the slave control unit calculates the basic current instruction value based on the master torque current instruction value when it is determined that the master torque current instruction value is normal, or calculates the basic current instruction value based on the torque current instruction value calculated by itself when the master torque current instruction value is determined to be unreliable.

8. A rotating electric machine control device for controlling driving of a rotating electric machine having a plurality of motor windings, comprising:

a plurality of control units capable of communicating with each other, the respective control units include:

a basic instruction calculation unit configured to calculate a basic current instruction value based on a torque instruction value;

a field-weakening calculation unit configured to calculate a field-weakening current instruction value; and a signal generator configured to generate a drive signal based on a d-axis current instruction value and a q-axis current instruction value calculated based on the basic current instruction value and the field-weakening current instruction value, wherein at least a part of the instruction values used for generating the drive signal is shared by the plurality of control units, wherein when one of the plurality of control units is a master control unit and the control unit(s) other than the master control unit is or are respectively a slave control unit, the master control unit transmits the d-axis current instruction value and the q-axis current instruction value calculated by the master control unit as the instruction values to the slave control unit, and the slave control unit generates the drive signal using the master d-axis current instruction value and the q-axis current instruction value when it is determined that the master d-axis current instruction value that is a d-axis current instruction value transmitted from the master control unit and the master q-axis current instruction value that is a q-axis current instruction value transmitted from the master control unit are normal, or generates the drive signal using the d-axis current instruction value and the q-axis current instruction value calculated by itself when it is determined that the master d-axis current instruction value and the master q-axis current instruction value are not reliable.

* * * * *